(12) United States Patent
Ohtsubo et al.

(10) Patent No.: US 7,437,229 B2
(45) Date of Patent: Oct. 14, 2008

(54) DRIVING POSITION ADJUSTING DEVICE FOR AUTOMOTIVE VEHICLE

(75) Inventors: Tomonori Ohtsubo, Hiroshima (JP); Hiroki Uemura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 413 days.

(21) Appl. No.: 11/167,130

(22) Filed: Jun. 28, 2005

(65) Prior Publication Data

US 2006/0041359 A1  Feb. 23, 2006

(30) Foreign Application Priority Data

Aug. 3, 2004  (JP) ............... 2004-226910
Aug. 3, 2004  (JP) ............... 2004-226986

(51) Int. Cl.
*G05G 1/40* (2008.04)
*B62D 25/20* (2006.01)

(52) U.S. Cl. ......................... 701/49; 74/512
(58) Field of Classification Search ....................... None
See application file for complete search history.

(56) References Cited

U.S. PATENT DOCUMENTS 6,134,492 A * 10/2000 Breed et al. ............... 701/49
6,450,530 B1 * 9/2002 Frasher et al. ............... 280/735
6,474,728 B1 * 11/2002 Mendis et al. ............... 296/204
6,609,054 B2 * 8/2003 Wallace ....................... 701/45
6,614,344 B1 * 9/2003 Frasher et al. ............... 340/425.5
6,830,123 B2 * 12/2004 Ohki et al. .................. 180/326

FOREIGN PATENT DOCUMENTS

FR  2689081 A1 * 10/1993
JP  63-69655  5/1988

* cited by examiner

*Primary Examiner*—Michael J. Zanelli
(74) *Attorney, Agent, or Firm*—Studebaker & Brackett PC; Donald R. Studebaker

(57) ABSTRACT

The pedal adjusting devises and the floor adjusting device control pedals and the movable floor respectively according to the driver's body size detected, with first adjusting characteristic such that the pedals become closer to the driver and the movable floor goes up further, as the driver's body size detected becomes small, and with second adjusting characteristics, which are different from the first characteristics, for the driver having the relatively small body size whose body size detected is smaller than the specified body size. Accordingly, the arrangement positions of the pedals and the going-up-and-down position of the floor can be properly adjusted for drivers having different body sizes.

18 Claims, 17 Drawing Sheets

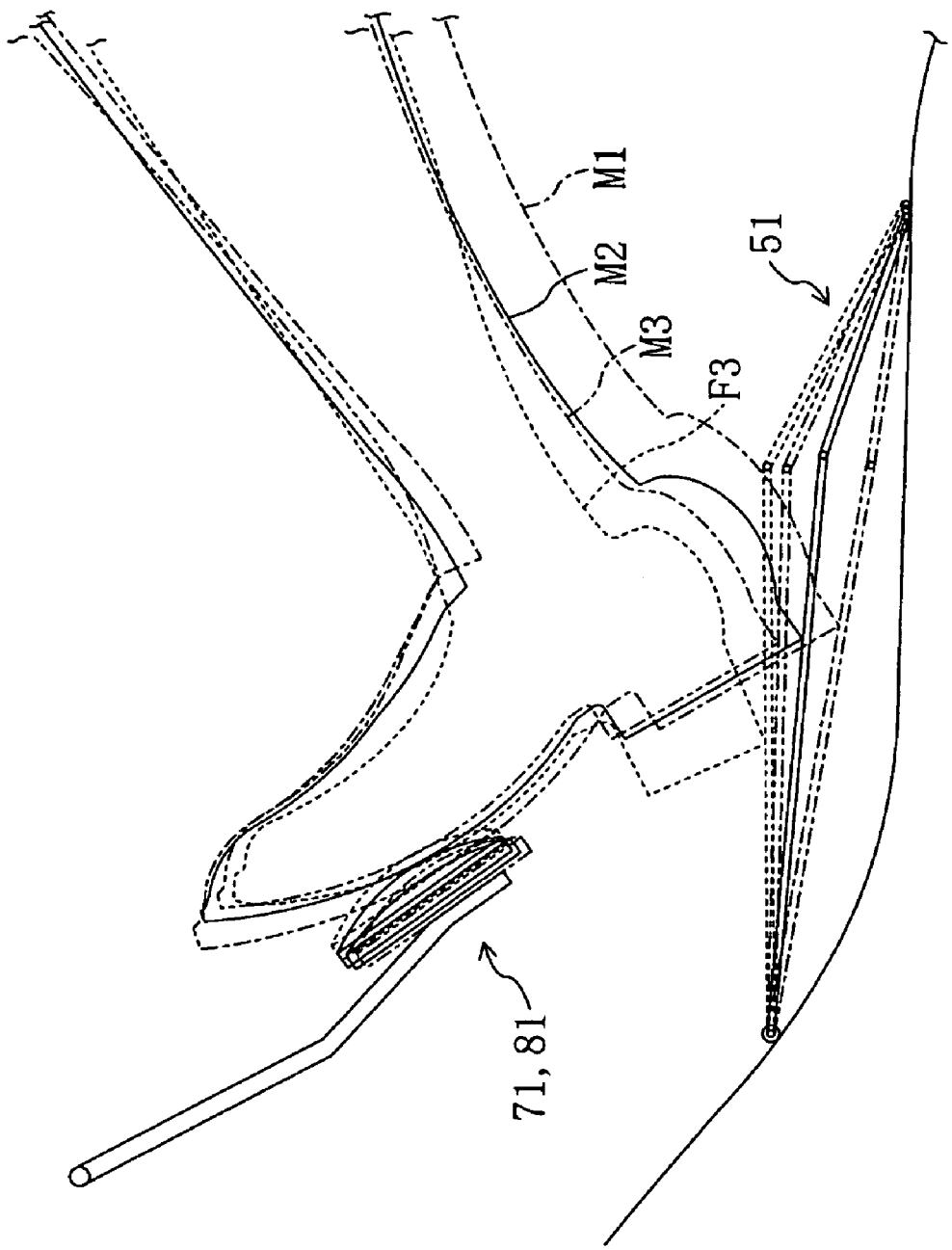

DRIVING POSITION ADJUSTING DEVICE FOR AUTOMOTIVE VEHICLE

BACKGROUND OF THE INVENTION

The present invention relates to a driving position adjusting device for an automotive vehicle which adjusts a driving position of a driver in a driver's seat. More specifically, the present invention relates to a device which adjusts a position of a driving operational system including a pedal operated by the driver, specifically an arrangement position of a pedal, or a going-up-and-down position of a movable floor which is disposed near the pedal.

Conventionally, different type of devices which adjust the position of the driving operational system including the pedal, the floor or the like according to a driver's body size detected are known (see, for example, Japanese Utility Model Publication No. 63-69655).

In the conventional devices, the driving operational system is adjusted such that its arrangement position becomes further away from the driver as the driver's body size becomes large, while its arrangement position becomes closer to the driver as the driver's body size becomes small. Namely, the arrangement position of the driving operational system is adjusted with an adjusting characteristic which is substantially in proportion to the driver's body size.

Herein, generally the female driver tends to wear shoes having high heels than the male driver. Thus, the substantially length of the driver's legs differs according the heel height of the shoes the driver wears, and thereby it differs from the real body size of the driver. Accordingly, there is a problem that the position of the pedal or the floor disposed near the pedal, which belong to the driving operational system, could not be properly adjusted with an adjusting characteristic which is just in proportion to the driver's body size.

SUMMARY OF THE INVENTION

The present invention has been devised in view of the above-described problem, and an object of the present invention is to provide a driving position adjusting device for an automotive vehicle which can adjust the position of the driving operational system properly for drivers having different body sizes.

According to the present invention, there is provided a driving position adjusting device for an automotive vehicle which adjusts a driving position of a driver in a driver's seat, comprising a driver's body size detecting device operative to detect a body size of the driver, a driving operational system including a pedal operated by the driver, an adjusting device operative to adjust a position of the driving operational system, a control device operative to control the adjusting device, wherein the control device controls the adjusting device with a first adjusting characteristic and a second adjusting characteristic according to the driver's body size detected by the driver's body size detecting device, the above-described first adjusting characteristic being such that the position of the driving operational system adjusted by the adjusting device becomes closer to the driver as the driver's body size detected becomes small, the above-described second adjusting characteristic being to control the adjusting device for the driver having a relatively small body size whose body size detected is smaller than a specified body size, the second adjusting characteristic having a different characteristic with respect to the driver's body size from the first adjusting characteristic.

According to this constitution, the position of the driving operational system with respect to the driver can be properly adjusted in consideration of the driver' body size and the heel height of the driver's shoes.

Specifically, the driving position adjusting device comprises a pedal adjusting device operative to adjust an arrangement position of the pedal. Herein, the pedal adjusting device adjusts the pedal arrangement position with a first adjusting characteristic and a second adjusting characteristic according to the driver's body size detected by the driver's body size detecting device, wherein the first adjusting characteristic is such that the pedal arrangement position adjusted by the pedal adjusting device becomes closer to the driver as the driver's body size detected becomes small, the second adjusting characteristic is to control the pedal adjusting device for the driver having the relatively small body size whose body size detected is smaller than the specified body size, and the second adjusting characteristic has a different characteristic with respect to the driver's body size from the first adjusting characteristic.

Accordingly, since the pedal arrangement position (an operational angle and a height of a pedal pressing face) is adjusted with the first adjusting characteristic which is substantially in proportion to the driver' body size, the pedal position becomes closer to the driver as the driver's body size becomes small, so that the pedal arrangement position can be adjusted properly according to the driver's body size.

Further, the pedal arrangement position is adjusted with the second adjusting characteristic for the driver whose body size detected is smaller than the specified body size. Namely, since there exists a case where the pedal position could not properly adjusted only with the first adjusting characteristic in proportion to the driver's body size due to the height of the heels of the shoes which the driver wears, the second adjusting characteristic different to the first adjusting characteristic is used for the driver having the relatively small body size. Thus, the pedal arrangement position can be adjusted properly according to the driver's body size in consideration of the height of the heels of the shoes.

Meanwhile, the driving position adjusting device comprises a movable floor which is disposed near the pedal of the driving operational system and arranged so as to go up and down, and a floor adjusting device operative to adjust a going-up-and-down position of the movable floor. Herein, the floor adjusting device adjusts going-up-and-down position of the movable floor with a first adjusting characteristic and a second adjusting characteristic according to the driver's body size detected by the driver's body size detecting device, wherein the first adjusting characteristic is such that the going-up-and-down position of the movable floor adjusted becomes higher as the driver's body size detected becomes small, the second adjusting characteristic is to control the floor adjusting device for the driver having the relatively small body size whose body size detected is smaller than the specified body size, and the second adjusting characteristic has the different characteristic with respect to the driver's body size from the first adjusting characteristic.

Accordingly, like the above-described pedal position adjustment, since the going-up-and-down position of the movable floor is adjusted with the first adjusting characteristic which is substantially in proportion to the driver' body size, the movable floor adjusted goes up higher as the driver's body size detected becomes small, so that the going-up-and-down position of the movable floor can be adjusted properly according to the driver's body size.

Also, since the going-up-and-down position of the movable floor is adjusted with the second adjusting characteristic different from the first adjusting characteristic for the driver whose body size detected is small than the specified body size, it can be adjusted properly according to the driver's body size in consideration of the height of the heels of the shoes.

Herein, the above-described "the specified body size" may be set at, for example, a body size of a relatively small-sized male driver. Herein, drivers with such a body size smaller than the specified body size can be considered as female drivers. Namely, it is assumed that such drivers may be equivalent to the drivers who tend to wear shows with high heels.

The second adjusting characteristic may be such that the pedal arrangement position adjusted or the going-up-and-down position of the movable floor adjusted becomes closer to the driver as the driver's body size detected becomes small, and such that a changing amount of adjusting the pedal arrangement position or the going-up-and-down position of the movable floor with respect to the driver's body size is restrained compared with the first adjusting characteristic.

Accordingly, the pedal arrangement position or the going-up-and-down position of the movable floor for the driver having the body size smaller than the specified body size are adjusted by the pedal adjusting device or the floor adjusting device so as not to be changed greatly compared with the respective positions for the driver having the specified body size. Thus, the pedal arrangement position or the going-up-and-down position of the movable floor can be properly adjusted for the female driver whose substantial length of the legs becomes longer due to the shoes with high heels.

Also, since the second adjusting characteristic is the characteristic in which the adjusting amount is somewhat restrained, the moving range of the pedal and the movable floor can be made smaller, thereby enlarging a passenger-compartment space of the vehicle.

Also, the second adjusting characteristic may be such that the pedal arrangement position adjusted or the going-up-and-down position adjusted of the movable floor do not change substantially according to the driver's body size.

Accordingly, the pedal arrangement position or the going-up-and-down position of the movable floor for the driver having the body size smaller than the specified body size are adjusted so as to remain at the positions for the driver having the specified body size. Thus, likewise, the pedal arrangement position or the going-up-and-down position of the movable floor can be properly adjusted for the female driver whose substantial length of the legs becomes longer due to the shoes with high heels. Also, the moving range of the pedal and the movable floor can be made smaller, thereby enlarging the passenger-compartment space of the vehicle as well.

Also, the second adjusting characteristic may be such that the pedal arrangement position adjusted becomes further away from the driver or the going-up-and-down position of the movable floor adjusted becomes lower as the driver's body size detected becomes small.

Accordingly, the pedal arrangement position or the going-up-and-down position of the movable floor for the driver having the body size smaller than the specified body size are adjusted such that the pedal arrangement position adjusted is further away from the driver or the going-up-and-down position of the movable floor adjusted is lower, compared with the respective positions for the driver having the specified body size. Thus, likewise, the pedal arrangement position or the going-up-and-down position of the movable floor can be properly adjusted for the female driver whose substantial length of the legs becomes longer due to the shoes with high heels. Also, the moving range of the pedal and the movable floor can be made smaller, thereby enlarging the passenger-compartment space of the vehicle as well.

The above-described pedal comprises a bake pedal and an accelerator pedal, and the above-described pedal adjusting device comprises a brake pedal adjusting device operative to adjust a position of the brake pedal and an accelerator pedal adjusting device operative to adjust a position of the accelerator pedal. Herein, the control device may control the brake pedal adjusting device with the first adjusting characteristic and control the accelerator pedal adjusting device with the first and second adjusting characteristics.

Namely, since the accelerator pedal is operated by the driver's foot with its heel placed on the floor, the position of the accelerator pedal is adjusted by the accelerator adjusting device with the first and second adjusting characteristics. Accordingly, the appropriate adjusting of the accelerator pedal considering the heel height of the driver's shoes can be attained.

Meanwhile, since the brake pedal is operated by the driver's foot with its heel away from the floor in most cases, the appropriate arrangement position of the brake pedal would not be affected by the heel height of the shoes. Also, the brake pedal tends to receive relatively strong pressing forces during the quick braking or the like, and generally the smaller sized drivers tend to press the pedal with a relatively smaller pressing force. Accordingly, the position of the brake pedal is adjusted by the brake pedal adjusting device with the first adjusting characteristic which is substantially proportional to the driver's body size. Thereby, the brake pedal is adjusted such that it becomes closer to the driver as the driver's body size becomes small. Thus, the appropriate pressing force can be ensured according to the driver's body size, adjusting the arrangement position of the brake pedal properly.

Accordingly, the proper adjustments of the pedal arrangement positions can be attained with the different adjusting characteristics for the accelerator pedal and the brake pedal.

Generally, the brake pedal and the accelerator pedal are arranged in such a manner that the brake pedal is a little behind the accelerator pedal (the brake pedal is located closer to the driver). This is because the pressing stroke of the brake pedal is longer than that of the accelerator pedal and thus the position difference between the both pedals which are pressed is made small as much as possible. Accordingly, the proper pedal-pressing changing from the brake pedal to the accelerator pedal during vehicle starting or the like can be ensured.

Also, the rearward disposition of the brake pedal would be appropriate to prevent an erroneous operation of the brake pedal, such as the panic braking.

Further, the brake pedal adjusting device and the accelerator pedal adjusting device may be controlled according to the driver's body size detected by the driver's body size detecting device such that a relative position of the brake pedal and the accelerator pedal becomes closer as the driver's body size detected becomes small.

Accordingly, as the driver's body size becomes small, the longitudinal and/or lateral distances between the brake and accelerator pedals becomes smaller. Thus, the necessary changing distance of the driver's foot between the both pedals becomes small. Thereby, it can be easy for the driver having the relatively small foot to change the pedal pressing between the pedals, thereby improving the pedal-pressing changing for any body-sized driver.

The above-described driving position adjusting device may also comprise a floor adjusting device.

Thereby, since the pedal arrangement position is adjusted by the pedal adjusting device and the floor going-up-and-down position is adjusted by the floor adjusting device, the driver's position with respect to the pedal can be adjusted more specifically and properly. Also, the adjusting amount of the pedal can be made smaller by the adjustment of the floor going-up-and-down position, and the pedal moving range can be made smaller, thereby enlarging the passenger-compartment space of the vehicle.

Also, there may be provided a seat adjusting device operative to adjust a position of a sitting face of the driver's seat and a seat position detecting device operative to detect the position of the sitting face of the driver's seat which is adjusted by said seat adjusting device. The driver's body size detecting device may comprise the seat position detecting device.

Accordingly, there is no need of providing an additional body size detecting device, and the body size is detected automatically by the position of the sitting face on which the driver sits after adjusting the seat adjusting device. Then, the pedal arrangement position is adjusted by the pedal adjusting device. Namely, the proper adjustment of the driver's driving position can be attained after the driver has decided the driver's proper position on the seat with respect to the steering wheel and driver' eyes by adjusting the sitting position.

The seat adjusting device may adjust a longitudinal position, a vertical position and an angle of the sitting face of the seat together such that the driver is located in a mode position corresponding to the driver's body size and the driver in the mode position is rotated around a specified rotational axis extending in a vehicle width direction, whereby the driver's eyes can be located substantially at the same position regardless of the body size of the driver. And, the pedal adjusting device may adjust the arrangement position of the pedal, in cooperation with the adjusting of the sitting face by the seat adjusting device.

Since the seat adjusting device adjusts the longitudinal position, vertical position and angle of the sitting face of the seat together, the moving range of the pedal and the movable floor can be made smaller, adjusting properly the sitting position of the driver having the different body sizes. Also, since the pedal adjusting device adjusts the operational angle and the height of pressing face of the pedal in cooperation with the adjusting of the sitting face by the seat adjusting device, the foot angle with respect to the pedal can be properly adjusted according to the rotated sitting position of the driver. Further, the floor adjusting device may adjust the going-up-and-down position and angle of the movable floor, in cooperation with the adjusting of the sitting face by the seat adjusting device. Likewise, the foot angle with respect to the pedal can be properly adjusted according to the rotated sitting position of the driver.

Other features, aspects, and advantages of the present invention will become apparent from the following description which refers to the accompanying drawings.

BRIEF DESCRIPTION OF THE DRAWINGS

FIG. 10 is a side view illustrating adjusted state of the floor and pedal according to a driver's body size.

DETAILED DESCRIPTION OF THE INVENTION

Hereinafter, preferred embodiments of the present invention will be described referring to the accompanying drawings. It should be understood that even though embodiments are separately described, single features thereof may be combined to additional embodiments.

Figure 1:
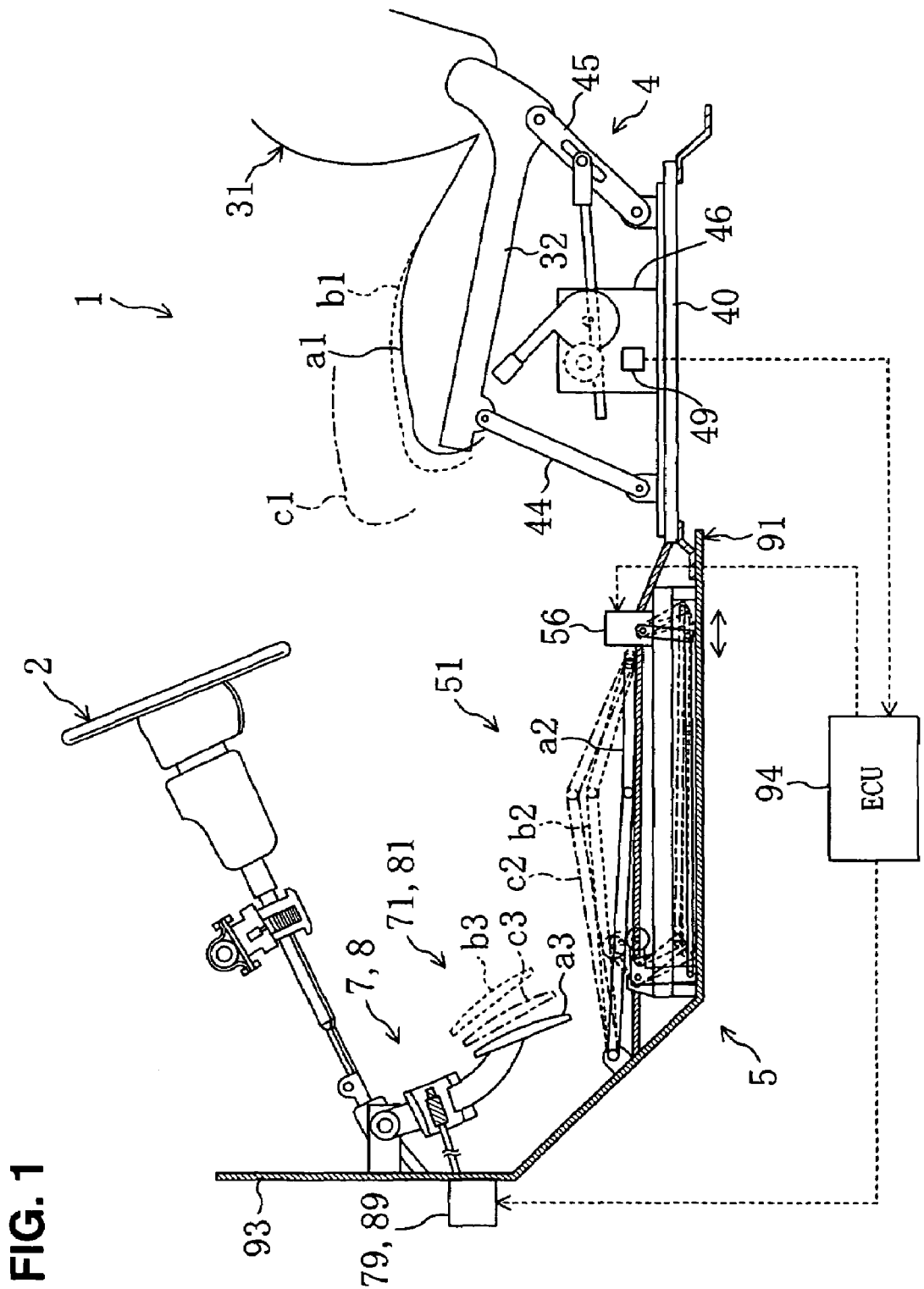
FIG. 1 is a diagram illustrating a structure of a driving position adjusting device for an automotive vehicle.

FIG. 1 illustrates an entire structure of a driving position adjusting device 1 for an automotive vehicle according to an embodiment of the present invention. The driving position adjusting device 1, which adjusts the driving position of the driver in a driver's seat 31 provided a steering wheel 2, comprises a seat adjusting device 4 operative to adjust a position of the seat 31, a floor adjusting device 5 operative to adjust a going-up-and-down position of a movable floor 51 which is disposed near pedals, an accelerator pedal adjusting device 7 operative to adjust an arrangement position of an accelerator pedal 71, and a brake pedal adjusting device 8 operative to adjust an arrangement position of a brake pedal 81.

Figure 2:
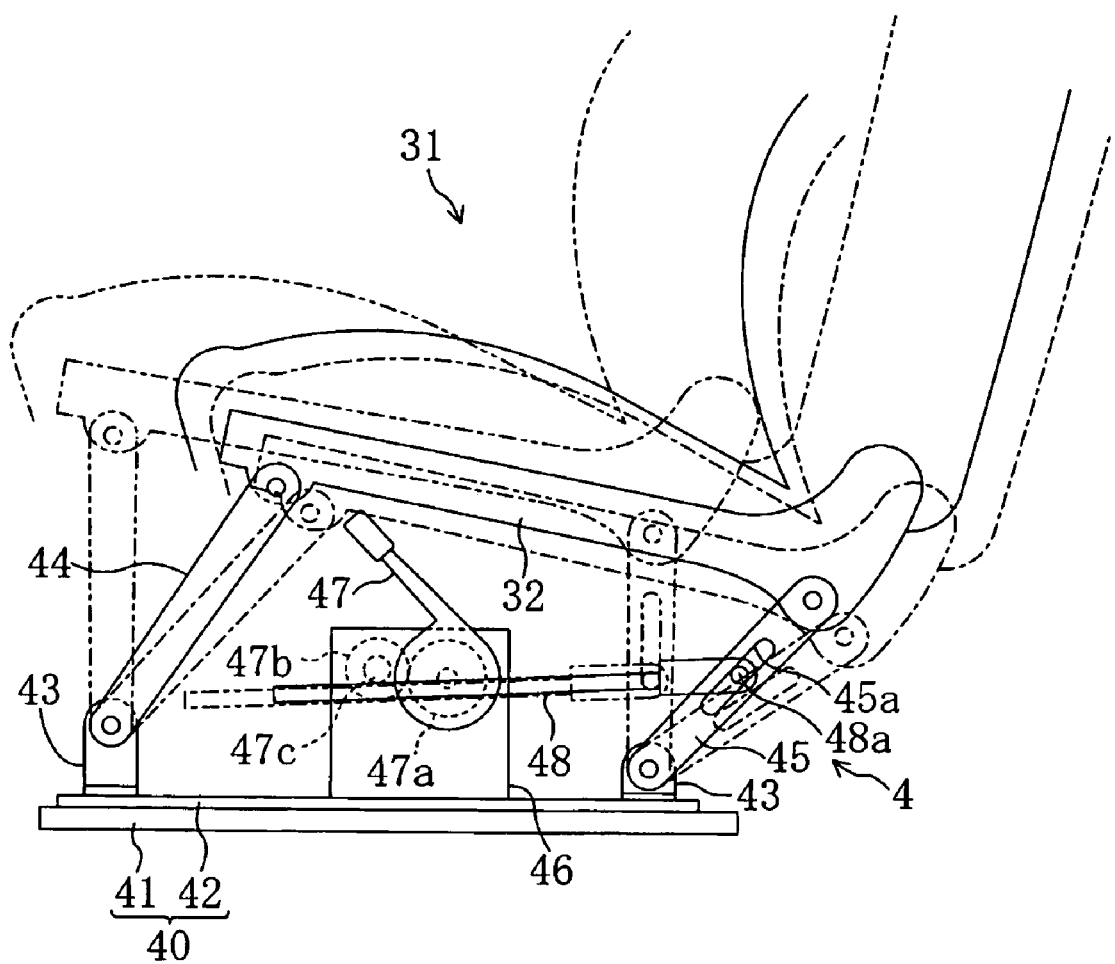
FIG. 2 is a side view illustrating a structure of a seat adjusting device.

There is provided a slide mechanism 40 at a portion on and under floor 91 where the driver seat is located. The slide mechanism 40, as illustrated in FIG. 2, comprises a pair of lower rails 41 which is fixed to the under floor 91, and a pair of upper rails 42 which is provided in a longitudinal direction of the vehicle (hereinafter referred to as simply "longitudinally"), engaging with the lower rails 41. Herein, the upper rails 42 are normally fixed to the lower rails.

The above-described seat adjusting device 4 is provided between the upper rails 42 and a seat frame 32 to which a seat cushion of the seat 31 is fixed, and adjusts a longitudinal position, a vertical position and an angle of a sitting face of the seat 31 together.

Specifically, the seat adjusting device 4 comprises a front link 44 and a rear link 45 which are coupled to support brackets 43 attached to the upper rail 42 via pin connection. The front link 44 is also coupled to a front end of the seat frame 32 via pin connection, and the rear link 45 is also coupled to a rear end of the seat frame 32.

Herein, the front link 44 is constituted so as to be longer than the rear link 45, and a slit 45a is formed at the rear link 45 so as to extend in the longitudinal direction of the rear link 45.

The seat adjusting device 4 is located at a middle position between the front and rear links 44 and 45, and comprises a gear box 46 which is fixed to the upper rail 42.

The gear box 46 comprises an operation lever 47, a ratchet 47a which is rotabaly attached to the operation lever 47, a gear 47b which can rotate engaging with the ratchet 47a, a pinion (or a worm) 47c which is integrated to and rotate with the gear 47b, and a rack member 48 which engages with the pinion 47c.

The operation lever 47, the lever to be operated by the driver manually, is attached to the gear box 46 so as to rotate around a rotational axis extending in the vehicle width direction. The above-described gear 47b and pinion 47c are attached to the gear box so as to rotate around another rotational axis which is parallel to the above-described rotational axis of the operation lever 47 (and the ratchet 47a).

The above-described rack member 48 is disposed so as to extend longitudinally, and its central portion engages with the pinion 47c. A rear end of the rack member 48 is coupled to the above-described slit 45a of the rear link 45 via pin connection.

According to the above-described structure, as the driver operates the operation lever 47, the rack member 48 moves longitudinally via the ratchet 47a, gear 47b and pinion 47c. Thereby, the rear link 45, which is coupled via a slide pin 48a, rises. Then, the seat frame 32 and the sitting face of the seat 31 change their positions according to the front and rear links 44 and 45. Herein, since the respective link length of the front link 44 and the rear link 45 are different, the longitudinal position, vertical position and angle of the sitting face are changed together. Specifically, as the sitting face moves forward, it moves upward and its angle relative to the horizontal line becomes small (as illustrated by two-dotted broken lines in FIG. 2). Meanwhile, as the sitting face moves rearward, it moves downward further and its angle relative to the horizontal line becomes larger (as illustrated by one-dotted broken lines in FIG. 2). Herein, a position a1 in FIG. 1 illustrates the sitting position of a driver having a large body size, a position b1 illustrates the sitting position of a driver having a specified body size (a male driver having a relatively small body size), a position c1 illustrates the sitting position of a driver having a body size smaller than the above-described specified body size (a female driver).

Figure 3:
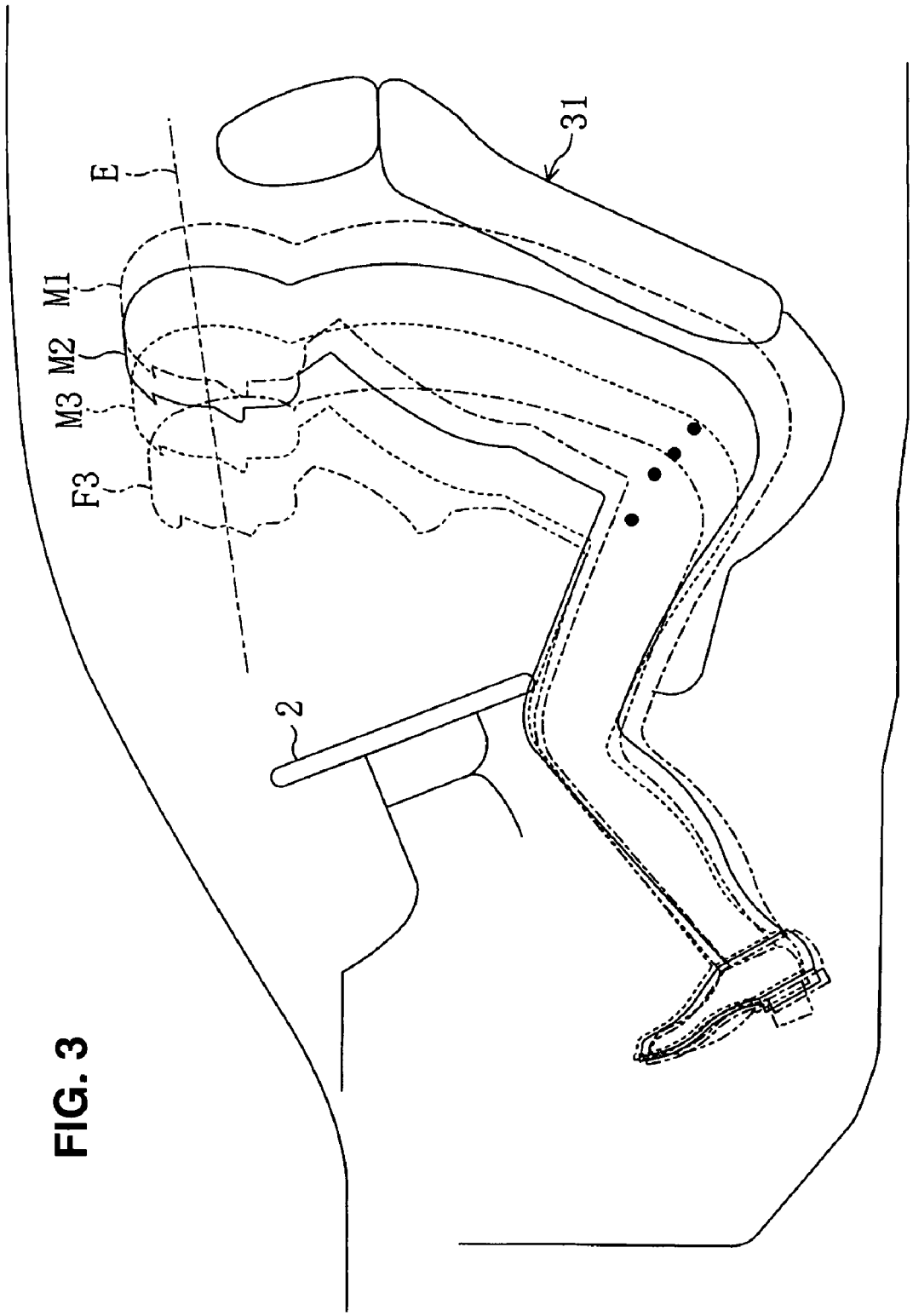
FIG. 3 is an explanatory diagram illustrating sitting positions of drivers having different body sizes.
Figure 4:
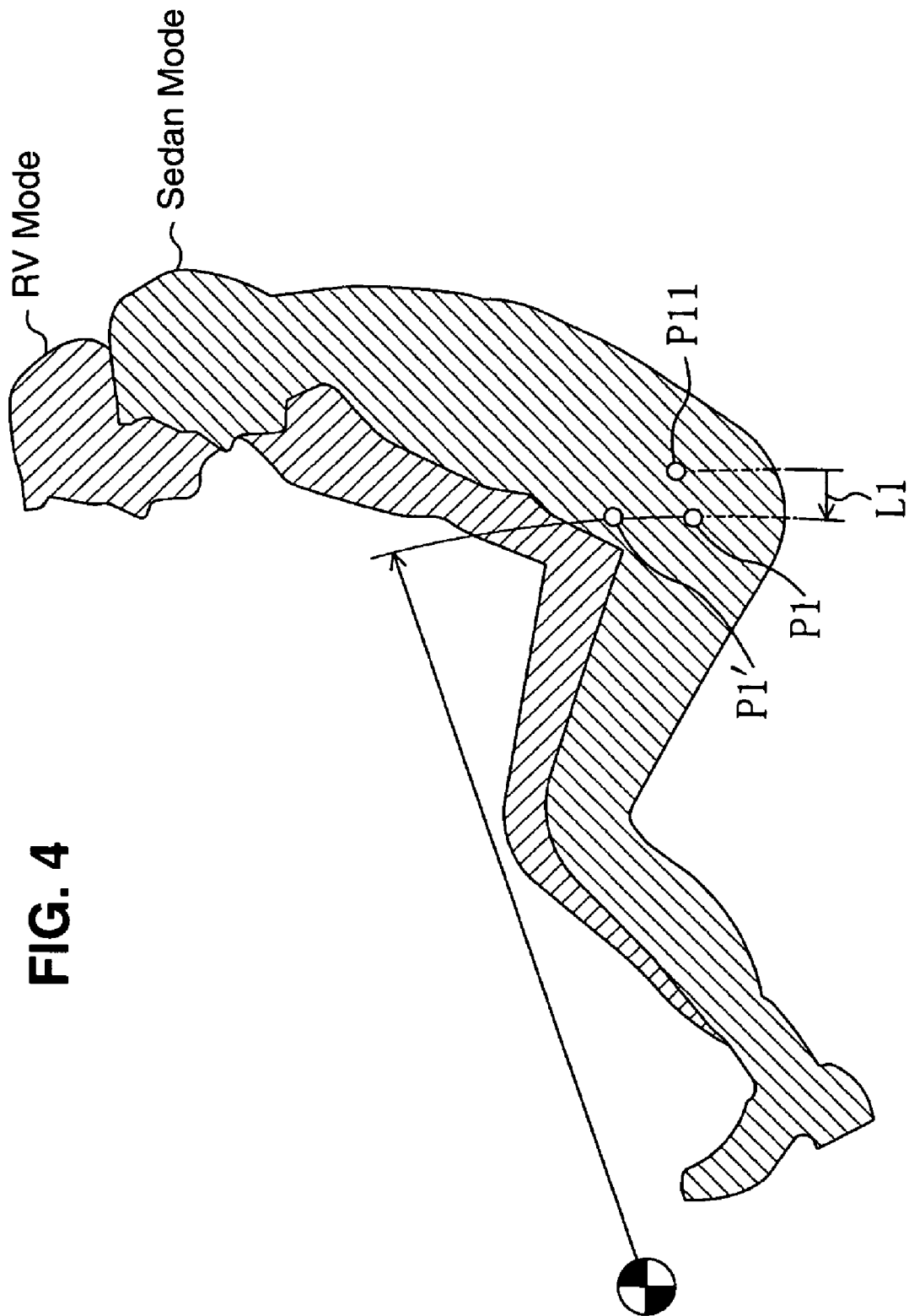
FIG. 4 is an explanatory diagram illustrating an adjusting concept of the sitting position.

As described above, since the longitudinal position, vertical position and angle of the sitting face are changed together, the driving position (mode) can be changed properly according to the driver's body size. Namely, as illustrated in FIG. 3, the large drivers M1 and M2 (the male driver having the relatively large body size) provide a driving position with bent knees (a so-called RV-vehicle driving position (RV mode), see FIG. 4). Also, the small drivers M3 and F3 (the male driver having the relatively small body size, or the female driver having the relatively small body size) provide a driving position with extended knees (a so-called sedan-vehicle driving position (sedan mode), see FIG. 4). Herein, as illustrated in FIG. 4, adjusting of the above-described sitting face is conducted so as to rotate the driver in the mode position corresponding to the body size around a specified rotational axis extending in the vehicle width direction (for example, a swinging axis of the accelerator pedal 71) (see P1 and P1' in FIG. 4). By combining these mode and rotation, the driver's eyes E of the respective different-body-sized drivers M1, M2 and M3 can be located substantially at the same position as illustrated in FIG. 3.

Further, since the driving position of the large driver is such that the knees are bent and the driving position of the small driver is such that the knees are extended, the longitudinal moving range of the seat 31 can be reduced properly (see L1 in FIG. 4).

And, the position of the seat 31 (the sitting face) is detected by a seat position detecting sensor 49 which is provided at the seat 31 as illustrated in FIG. 1.

Figure 5:
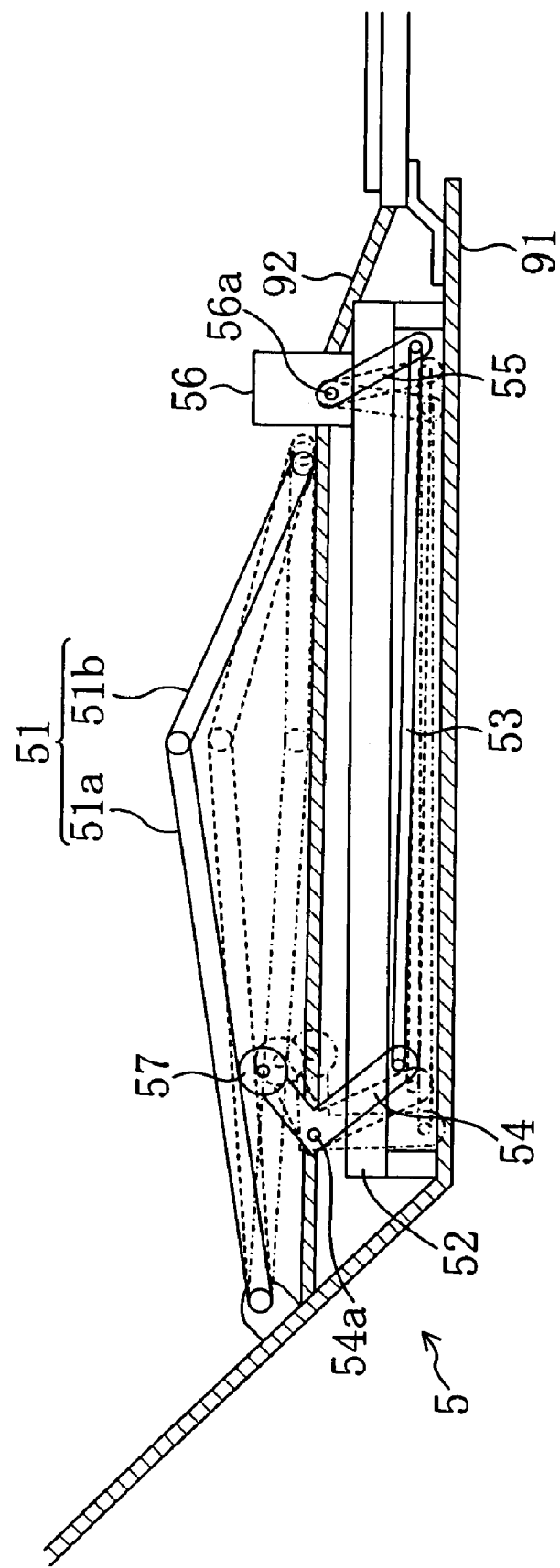
FIG. 5 is a sectional view illustrating a structure of a floor adjusting device.
Figure 6:
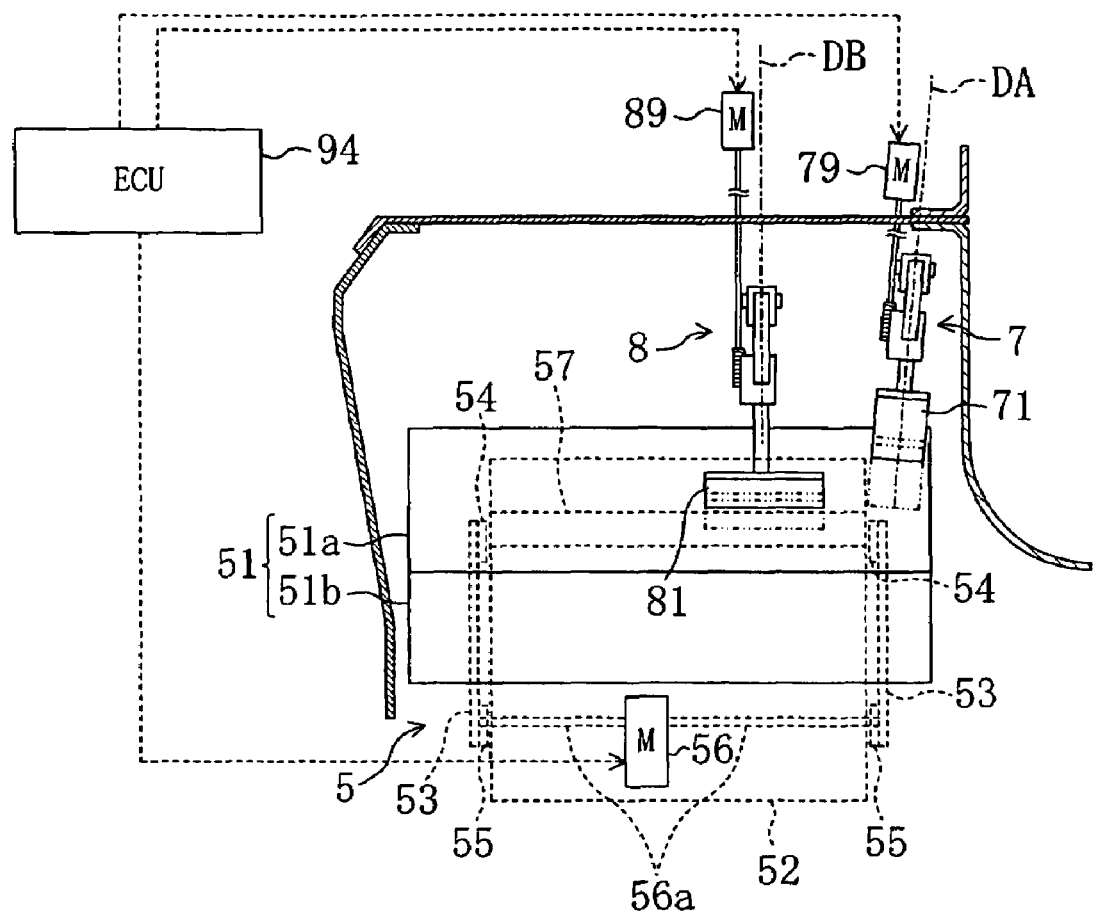
FIG. 6 is a plan view illustrating structure of the floor adjusting device and a pedal adjusting device.

The movable floor 51 which is adjusted by the floor adjusting device 5 is provided near the above-described pedals 71 and 81. The movable floor 51 comprises a front floor 51a and a rear floor 51b, which are pivotally connected, as illustrated in FIGS. 5 and 6. A front end of the front floor 51a is pivotally supported at the under floor 91 around a laterally-extending axis. A rear end of the rear floor 51b is placed on an upper floor 92, covering a base plate 52, so as to slide over the floor 92 according to the movement of the movable floor 51, which will be described in detail below.

The floor adjusting device 5 is provided between the fixed under floor 91 and the movable floor 51. The floor adjusting device 5 comprises the base plate 52 which is attached to the upper face of the under floor 91 and extends laterally below the driver seat, two link rods 53 (only one is illustrated in FIG. 5) which extend longitudinally, two swing arms 54 (only one is illustrated in FIG. 5) which are coupled to front ends of the link rods 53 via pin connection respectively, and two motor links 55 (only one is illustrated in FIG. 5) which are coupled to rear ends of the link rods 53 via pin connection respectively. Also, a floor motor 56 is provided at a central portion of the base plate 52 in the vehicle width direction, and its output shaft 56a extends outward in the vehicle width direction.

The two link rods 53 are disposed at the outer both sides of the base plate 52 respectively as illustrated in FIG. 6.

As illustrated in FIG. 5, respective one ends of the motor links 55 are coupled to the rear ends of the link rods 53 via pin connection, and their other ends are coupled to the output shaft 56a.

The respective swing arms 54 are formed respectively in a substantially L shape, when viewed from the side, and their bent portions are pivotally connected to a rotational axis 54a which is provided at the front end face of the base plate 52 and extends laterally. Respective one ends of the swing arms 54 are coupled to the front end of the link rods 53 via pin connection, and at the other ends of the swing arms 54 are rotatably attached a roller 57 which extend laterally. The roller 57 are disposed so as to interconnect the two swing arms 54 located at the both sides of the base plate 52, and also contact the lower face of the movable floor 51 (the front floor 51a).

Accordingly, when the floor motor 56 is driven, the link rods 53 move back and forth via the motor links 55, and thereby the swing arms 54 are rotated around the rotational axis 54. Thus, the vertical position of the roller 57 attached to the swing arms 54 is changed, and thereby the movable floor 51 contacted by the roller 57 goes up and down, so that the going-up-and-down position of the movable floor 51 can be changed. Namely, when the floor motor 56 is driven so as to move the link rods 53 rearward, the swing arms 54 are rotated anticlockwise, resulting in the roller 57 moving upward. Thereby, the front floor 51 rotates anticlockwise around the axis, and the rear floor 51b rotates clockwise. Then, the movable floor 51 goes up. Meanwhile, when the floor motor 56 is driven so as to move the link rods 53 forward, the swing arms 54 are rotated clockwise, resulting in the roller 57 moving downward. Thereby, the front floor 51 rotates clockwise around the axis, and the rear floor 51b rotates anticlockwise. Then, the movable floor 51 goes down. Herein, the angle of the movable floor 51 is also changed according to the going-up-and-down movement of the movable floor 51.

The above-described accelerator pedal adjusting device 7 and brake pedal adjusting device 8 adjust the operational angles and the heights of a pressing face of the accelerator pedal 71 and brake pedal 81 respectively at the same time. Since the structure of these devices 7 and 8 are substantially the same, the structure of the accelerator pedal adjusting device 7 will be described referring to FIGS. 7 and 8.

Figure 7:
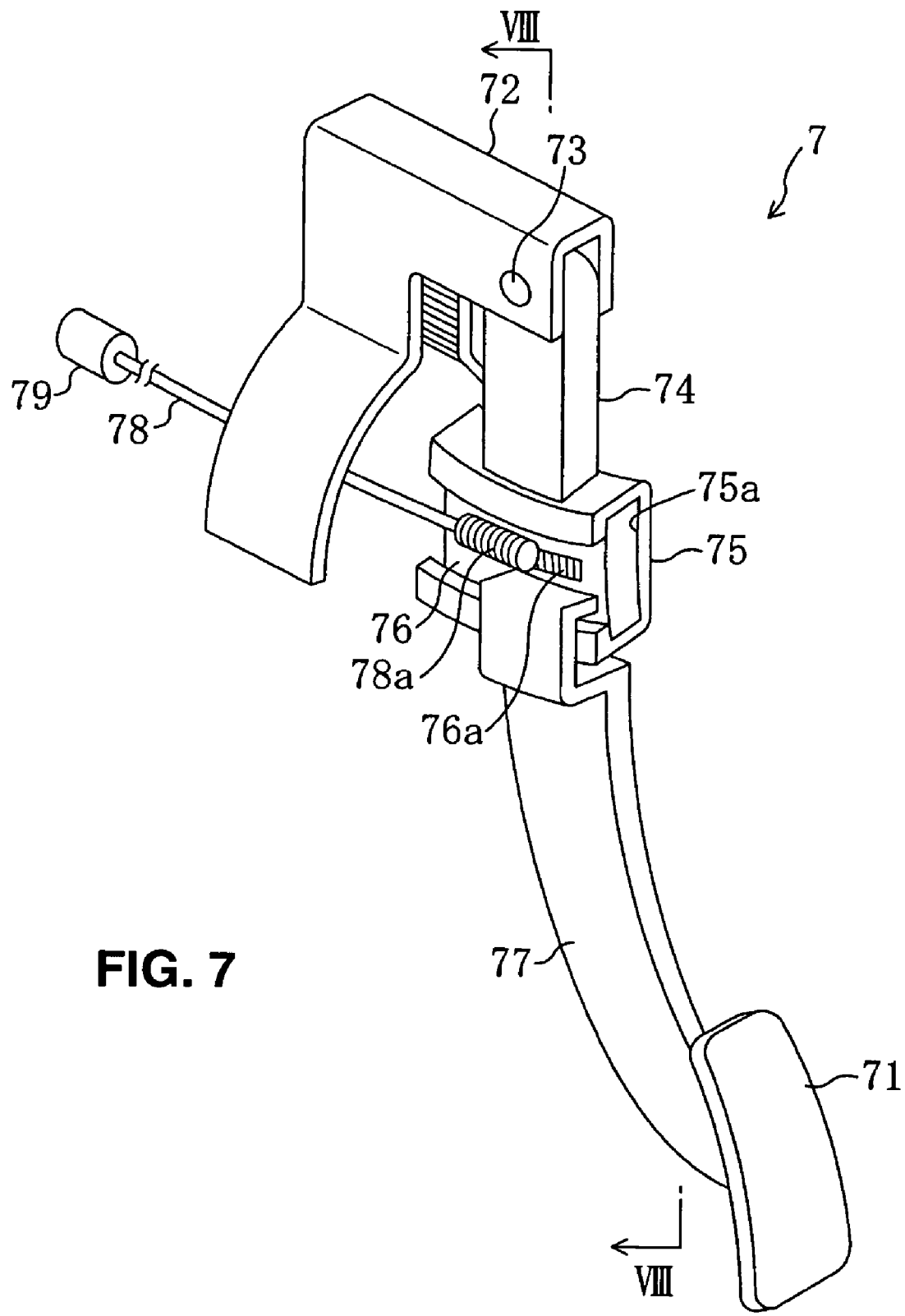
FIG. 7 is a perspective view illustrating the structure of the pedal adjusting device.
Figure 8:
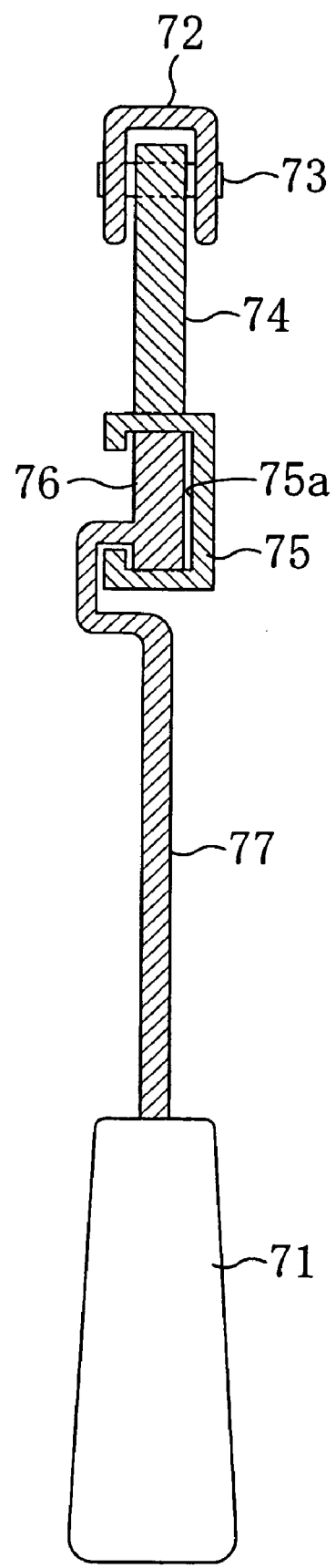
FIG. 8 is a sectional view taken along line VIII-VIII of FIG. 7.

As illustrated in FIGS. 7 and 8, the accelerator pedal adjusting device 7 comprises a bracket 72 attached to a dash panel 93 (see FIG. 1). To the bracket 72 is provided an axis 73 extending laterally to form a rotational axis of the accelerator pedal adjusting device 7, and an upper end of a pedal bracket upper 74 is pivotally coupled to the axis 73.

A guide member 75, which comprises a guide groove 75a having an arc shape with its center located at the axis 73, is formed integrally at a lower portion of the pedal bracket upper 74. A slider 76 is disposed in the guide groove 75a so as to slide along the arc shape. To the slider 76 is connected integrally an upper end of a pedal bracket lower 77 with the accelerator pedal 71. Also, a rack portion 76a is formed at the side face of the slider 76, and a worm gear 78a is provided so as to engage with the rack portion 76a all the time. The worm gear 78a is connected with a flexible wire 78 coupled to an output shaft of a motor 79 for the accelerator pedal, and thereby the worm gear 78a is rotated by the motor 79 via the flexible wire 78.

Accordingly, when the motor 79 for the accelerator pedal is driven, the worm gear 78a is rotated via the flexible wire 78, and the slider 76 with the rack portion 76a engaging with the worm gear 78a moves back and forth along the guide groove 75a. Then, accelerator pedal 71 is rotated around the axis 73 via the pedal bracket lower 77 according to the movement of the slider 76, so that the operational angle and the height of the pressing face of the accelerator pedal 71 can be adjusted together.

As described above, the structure of the accelerator pedal adjusting device 7 and brake pedal adjusting device 8 are substantially the same, and the brake pedal adjusting device 8 comprises a motor 89 for the brake pedal as illustrated in FIG. 6. Also, the brake pedal 81 is disposed such that its movement direction DB extends substantially longitudinally, but the accelerator pedal 71 is disposed such that its movement direction DA inclines, namely the front of the movement direction DA is located outside and the rear of it is located inside (toward the brake pedal 81).

The above-described driving position adjusting device 1 further comprises an ECU 94 as a control device to control the above-described floor motor 56, motor 79 for the accelerator pedal, and motor 89 for the brake pedal. The ECU 94 receives the detecting signal of the above-described seat position detecting sensor 49 and generates control signals to control the above-described motors 56, 79 and 89 based on adjusting characteristics which are set. Namely, since the seat position detected by the seat position detecting sensor 49 corresponds to the driver's body size, the ECU 94 adjusts properly the going-up-and-down position of the movable floor 51 and the respective arrangement positions of the accelerator pedal 71 and brake pedal 81 according to the driver's body size. Thus, according to the above-described driving position adjusting device 1, the floor adjusting device 5 adjusts the going-up-and-down position of the movable floor 51 and the accelerator pedal adjusting device 7 and brake pedal adjusting device 8 adjust the arrangement positions of the accelerator and brake pedals 71 and 81 respectively, in cooperation with the adjusting of the sitting face by the seat adjusting device 4.

Next, the adjusting control of the arrangement position of the accelerator and brake pedals 71 and 81 and the going-up-and-down position of the movable floor 51 by the above-described ECU 94 will be described.

Figure 9A:
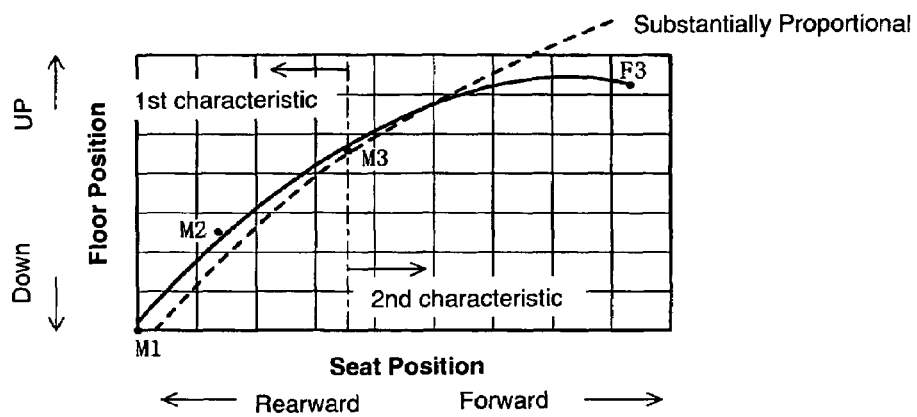
FIGS. 9A, 9B and 9C are exemplified adjusting characteristics of a movable floor and respective pedals.
Figure 9B:
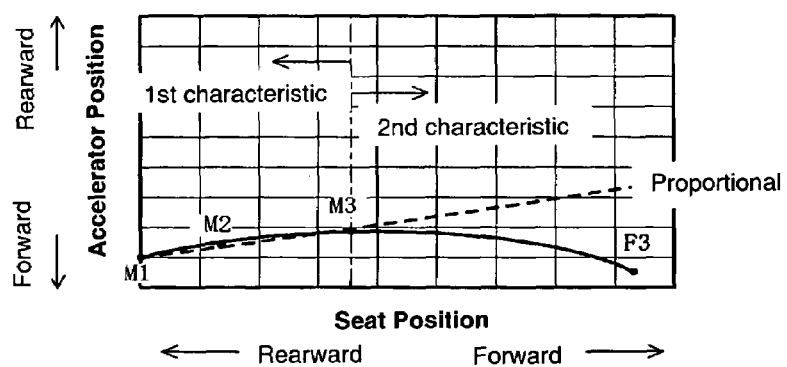
Figure 9C:
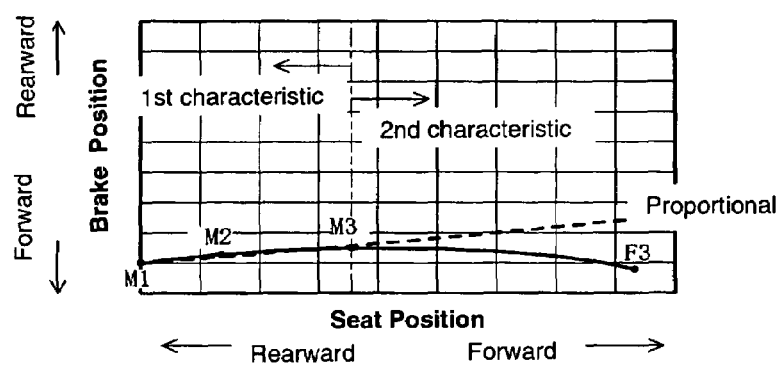

The ECU 94 has three maps of adjusting characteristics for adjusting the movable floor 51, accelerator and brake pedals 71 and 81 which have been set previously. Specifically, the ECU 94 includes, as illustrated in FIG. 9, a seat-floor map in which the desired going-up-and-down position of the movable floor 51 is set with respect to the seat position (FIG. 9A), a seat-accelerator pedal map in which the desired arrangement position of the accelerator pedal 71 is set with respect to the seat position (FIG. 9B), and a seat-brake pedal map in which the desired arrangement position of the brake pedal 81 is set with respect to the seat position (FIG. 9C). The going-up-and-down position of the movable floor 51, the arrangement position of the accelerator pedal 71, and the arrangement position of the brake pedal 81 are adjusted based on these maps.

The seat-floor map is set such that the going-up-and-down position of the movable floor 51 has a substantially liner relationship with the seat position (the first adjusting characteristic). Accordingly, the ECU 94 controls the floor motor 56 such that the going-up-and-down position of the movable floor 51 becomes higher as the seat position is located forward, in other wards, as the driver's body size becomes small. Herein, the seat-floor map is set such that its characteristic is a second adjusting characteristic for the situation in which the seat position is located before the seat position (M3) corresponding to the male driver having the relatively large body size, which is different from the above-described first adjusting characteristic. This second adjusting characteristic is such that the going-up-and-down position of the movable floor 51 becomes higher as the seat position is located forward, and such that a changing amount of adjusting the going-up-and-down position of the movable floor 51 with respect to the seat position is restrained compared with the first adjusting characteristic (hereinafter, referred to as "the restraint type").

The seat-accelerator pedal map is also set such that the arrangement position of the accelerator pedal 71 has a substantially liner relationship with the seat position (the first adjusting characteristic). Accordingly, the ECU 94 controls the motor 79 for the accelerator pedal such that the accelerator pedal 71 gets closer to the driver as the seat position is located forward, in other wards, as the driver's body size becomes small. Herein, the seat-accelerator pedal map is set such that its characteristic is a second adjusting characteristic for the situation in which the seat position is located before the seat position (M3), which is different from the above-described first adjusting characteristic. Herein, this second adjusting characteristic is such that the accelerator pedal 71 goes further away from the driver as the seat position is located forward (hereinafter, referred to as "the turnover type").

Also, the seat-brake pedal map is set such that the arrangement position of the brake pedal 81 has a substantially liner relationship with the seat position (the first adjusting characteristic). Accordingly, the ECU 94 controls the motor 89 for the brake pedal such that the brake pedal 81 gets closer to the driver as the driver's body size becomes small. Herein, the seat-brake pedal map is also set such that its characteristic is a second adjusting characteristic for the situation in which the seat position is located before the seat position (M3), which is different from the above-described first adjusting characteristic. This second adjusting characteristic is set in the turnover type, like the seat-accelerator pedal map.

Accordingly, when the position of the sitting face is adjusted by the operation lever 47, the position is detected by the seat position detecting device 49. The ECU 94 receives the detecting signal and then decides the desired motor control amount according to the above-described maps. Thus, the ECU 94 controls the floor motor 56, the motor 79 for the accelerator pedal and the motor 89 for the brake pedal with the decided desired motor control amount, respectively. Accordingly, as illustrated in FIG. 1, when the seat position is in the position a1, in other words, the driver having the large body size sits in the seat (M1), the movable floor 51 is located in the lower position a2, and both the accelerator pedal 71 and the brake pedal 81 are located in the forward position a3 which is further away from the driver. When the seat position is in the position b1, in other words, the driver having the specified body size (M3) sits, the movable floor 51 is located in the upper position b2, and both the accelerator pedal 71 and the brake pedal 81 are located in the position b3 which is closer to the driver. When the seat position is in the position c1, in other words, the driver having the specified body size (F3) sits, the movable floor 51 is located in the further above position c2, and both the accelerator pedal 71 and the brake pedal 81 are located in the middle position c3.

Thus, the accelerator pedal 71 and the brake pedal 81 for the large-sized driver, generally the female driver are located further away from the driver than those for the relatively small-sized male driver (M3). Accordingly, even in the case where many female drivers having the small body size wear high heels and thereby the substantial length of the driver' legs becomes relatively long for the body size, the accelerator pedal 71 and the brake pedal 81 can be located properly as illustrated in FIG. 10.

Also, since the movement direction of the accelerator pedal 71 is inclined with respect to the longitudinal direction as illustrated in FIG. 6, the lateral distance between the accelerator pedal 71 and the brake pedal 81 becomes smaller as the accelerator pedal 71 is located rearward. Accordingly, as the driver's body size becomes small, the lateral distance between the pedals 71 and 81 becomes smaller. Thereby, it can be easy for the driver having a relatively small foot to change a pedal pressing between the pedals 71 and 81, thereby improving the pedal-pressing changing.

Also, since the second adjusting characteristic for the both pedals 71 and 81 is the turnover type with the adjusting direction being opposite to that of the first adjusting characteristic, the moving range of these pedals 71 and 81 can be made smaller, thereby enlarging a passenger-compartment space of the vehicle.

Likewise, since the second adjusting characteristic for the movable floor 51 is the restraint type with the restrained adjusting amount, the moving range of the movable floor 51 can be made smaller, thereby enlarging the passenger-compartment space of the vehicle as well.

Further, since the driving position is adjusted by adjusting the accelerator pedal 71, the brake pedal 81 and the movable floor 51 together, the driver's position with respect to the pedals can be adjusted specifically and properly. Also, compared with the case where these pedals 71 and 81 and the floor 51 are adjusted independently and separately, the respective adjusting amount of these pedals and floor can be reduced, thereby further enlarging the passenger-compartment space.

Also, since the ECU 94 controls the respective position adjusting of the pedals 71 and 81 and the movable floor 51 based on detecting results by the seat position detecting sensor 49, the position adjusting of these are done after the driving position of the driver has been decided by the driver's setting the sitting face. Namely, the driver's driving position can be adjusted properly through the steps of first adjusting the seat position and then adjusting the respective positions of the both pedals 71 and 81 and the movable floor 51.

Particularly, the seat adjusting device 4 rotates the driver in the mode position properly corresponding to the driver's body size around the specified lateral axis, the pedal adjusting devices 7 and 8 adjust the respective operational angles of the accelerator pedal 71 and the brake pedal 81, and the floor adjusting device 5 adjusts the going-up-and-down position and the angle of the movable floor 51. Thereby, the angle of the driver's foot with respect to the pedals can be adjusted properly according to the driver's sitting position.

[Modified Examples of Adjusting Characteristics of the Pedals and Movable Floor]

The adjusting characteristics (the second adjusting characteristic) of the respective pedals 71 and 81 and the movable floor 51 should not be limited to those shown in FIG. 9. Hereinafter, other modified examples of these adjusting characteristics will be described.

[Modified Example 1]

Figure 11A:
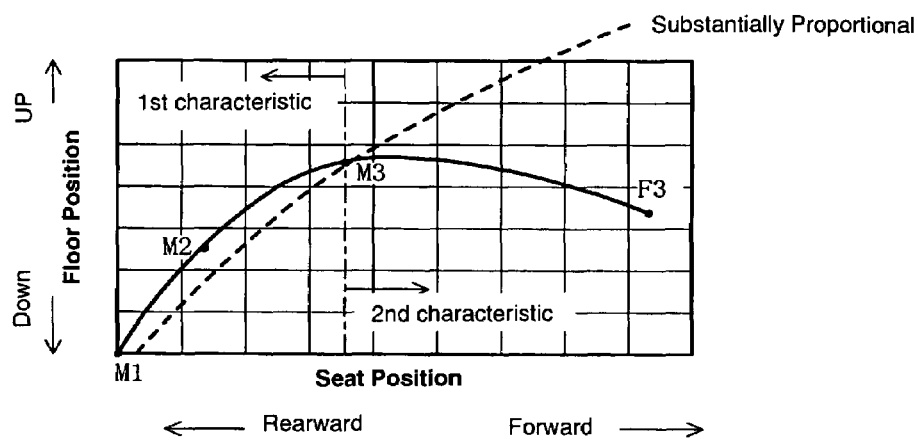
FIGS. 11A, 11B and 11C are other exemplified adjusting characteristics of the movable floor and respective pedals.

The turnover type of adjusting characteristic may be applied to the second adjusting characteristic for the movable floor 51. Namely, as shown in FIG. 11A, the seat-floor map is basically set such that the going-up-and-down position of the movable floor 51 has the substantially liner relationship with the seat position (the first adjusting characteristic). Meanwhile, the seat-floor map is set such that the going-up-and-down position of the movable floor 51 becomes lower as the seat position is located forward (the second adjusting characteristic) when the seat position is located before the specified seat position (M3). Accordingly, the ECU 94 controls the floor motor 56 such that the going-up-and-down position of the movable floor 51 becomes higher as the seat position is located forward, in other wards, as the driver's body size becomes small. When the seat position is located before the specified seat position (M3), the floor motor 56 is controlled such that the going-up-and-down position of the movable floor 51 becomes lower as the seat position is located forward.

Figure 11B:
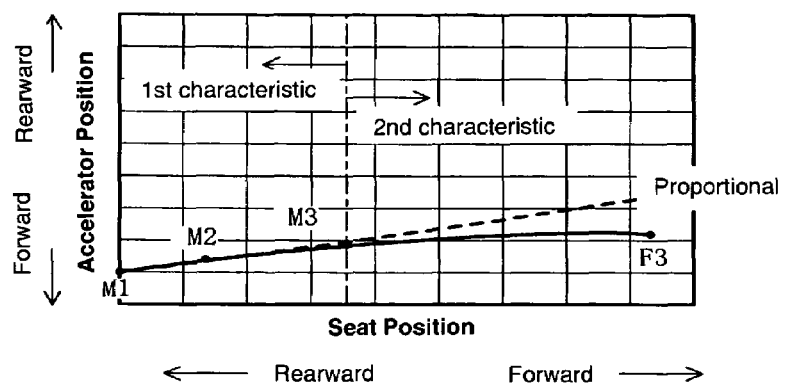
Figure 11C:
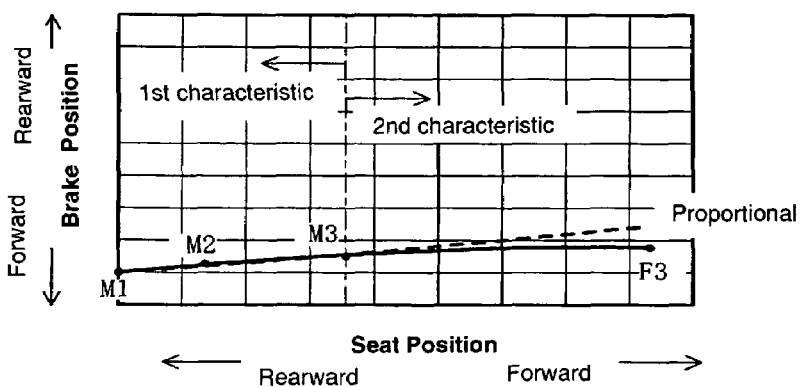

Also, the restraint type of adjusting characteristic may be applied to the second adjusting characteristic for the accelerator pedal 71 and the brake pedal 81. Namely, as shown in FIGS. 11B and 11C, the seat-accelerator pedal map and the seat-brake pedal map are basically set such that the arrangement positions of the accelerator and brake pedals 71 and 81 have the substantially liner relationship with the seat position (the first adjusting characteristic). Meanwhile, when the seat position is located before the specified seat position (M3), the seat-accelerator pedal map and the seat-brake pedal map are set such that the accelerator and brake pedals 71 and 81 get closer to the driver as the seat position is located forward (the second adjusting characteristic), the adjusting amount of which is retrained compared with the first adjusting characteristic. Accordingly, the ECU 94 controls the motors 79 and 89 for the pedals such that the pedals 71 and 81 get closer to the driver as the seat position is located forward, in other wards, as the driver's body size becomes small. When the seat position is located before the specified seat position (M3), the pedals 71 and 81 are controlled so as not to move a lot.

Figure 12:
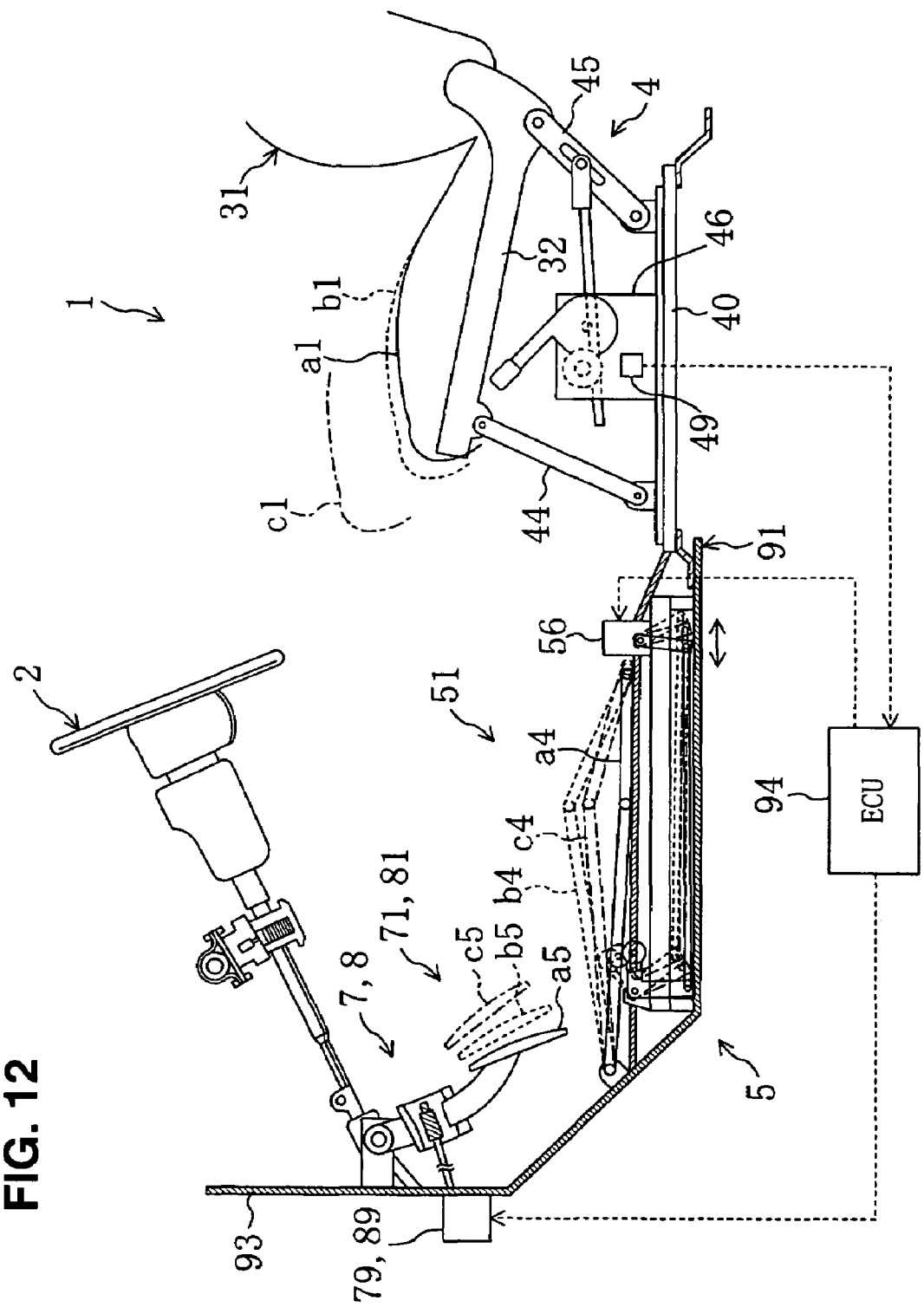
FIG. 12 is a side view illustrating adjusted state of the floor and pedal according to the characteristics of FIG. 11.

Thus, as illustrated in FIG. 12, when the seat position is in the position a1, in other words, the driver having the large body size sits in the seat (M1), the movable floor 51 is located in the lower position a4, and both the accelerator pedal 71 and the brake pedal 81 are located in the forward position a3 which is further away from the driver. When the seat position is in the position b1, in other words, the driver having the specified body size (M3) sits, the movable floor 51 is located in the upper position b4, and both the accelerator pedal 71 and the brake pedal 81 are located in the middle position b5. When the seat position is in the position c1, in other words, the driver having the specified body size (F3) sits, the movable floor 51 is located in the middle position c4, and both the accelerator pedal 71 and the brake pedal 81 are located in the rearward position c5 which is closer to the driver.

In this case, the arrangement positions of the accelerator and brake pedals 71 and 81 can be also located properly for the female driver wearing high heels as well.

[Modified Example 2]

Figure 13A:
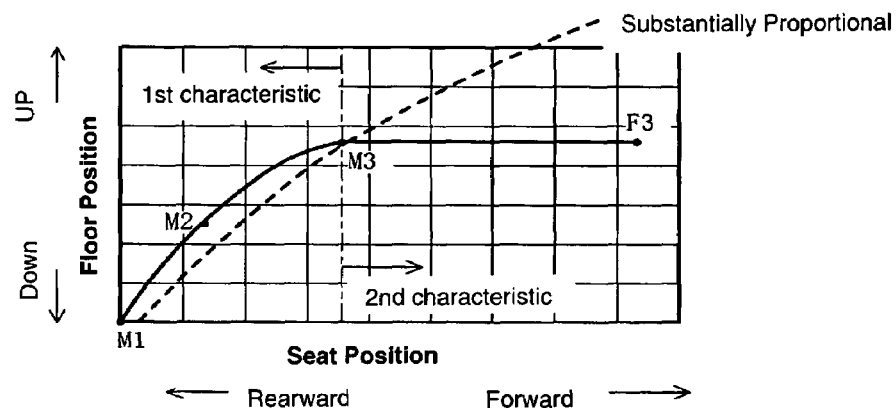
FIGS. 13A, 13B and 13C are further other exemplified adjusting characteristics of the movable floor and respective pedals.
Figure 13B:
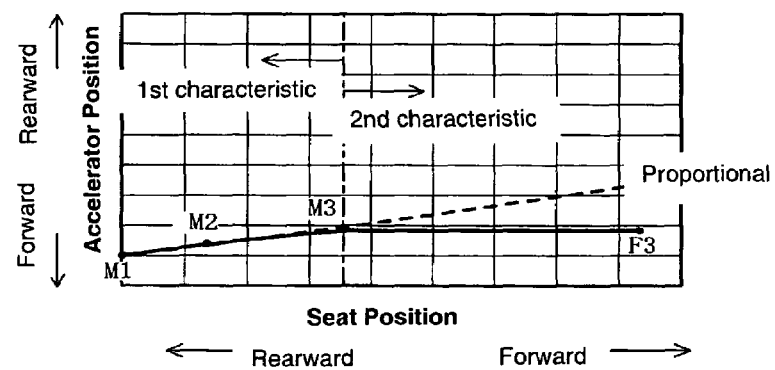
Figure 13C:
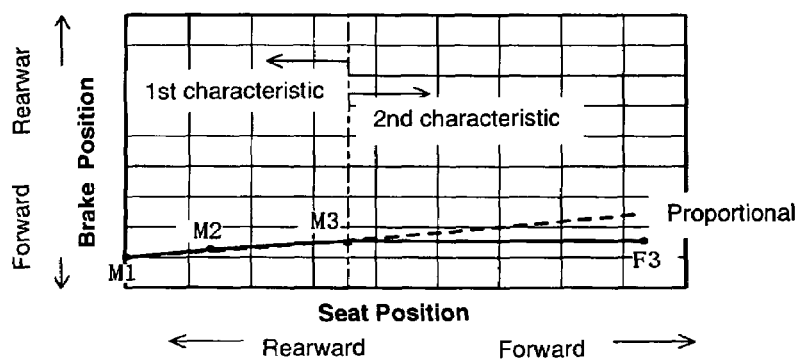

The second adjusting characteristic for the movable floor 51 may also be set such the going-up-and-down position of the movable floor does not change substantially according to the seat position's change (hereinafter, referred to as "the prohibition type"), as shown in FIG. 13A. Likewise, the second adjusting characteristic for the pedals 71 and 81 may be set at this prohibition type in which the arrangement positions of the pedals 71 and 81 do not change substantially according to the seat position's change, as shown in FIGS. 13B and 13C.

[Modified Example 3]

Figure 14A:
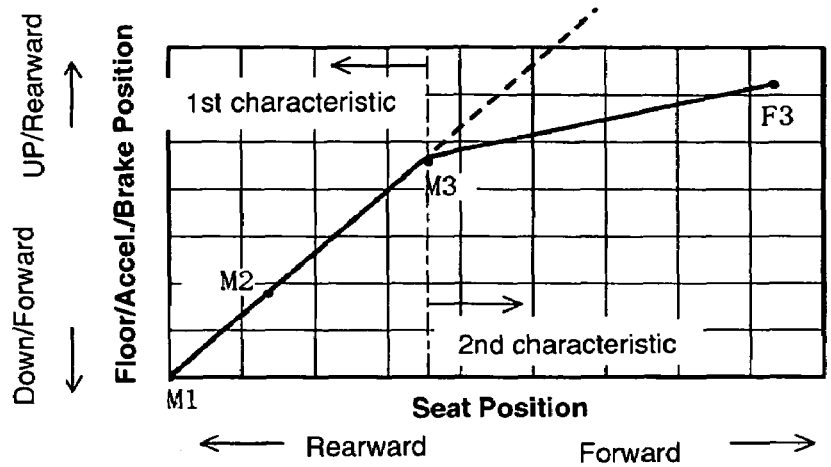
FIGS. 14A, 14B and 14C are other exemplified adjusting characteristics of the movable floor and respective pedals, which has features like a linear function (a function of the first degree).
Figure 14B:
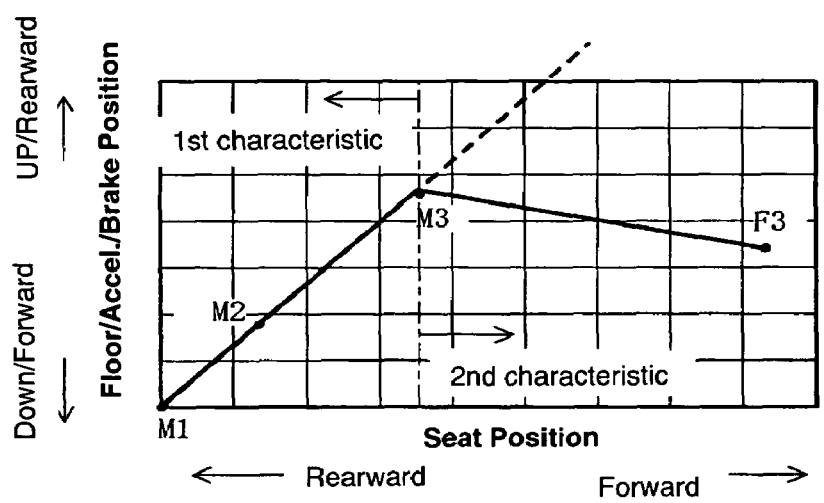
Figure 14C:
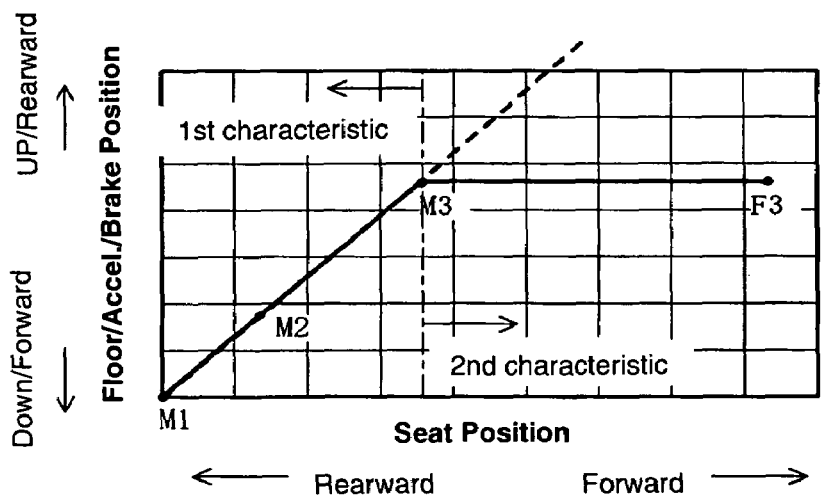

The above-described pedals 71 and 81 and the movable floor 51 are adjusted by the motors 56, 79 and 89 electrically controlled by the ECU 94 with the function of secondary degree with respect to the seat position. However, these adjusting may be conducted with the linear function (function of the first degree) with respect to the seat position as shown in FIGS. 14A, 14B and 14C. Specifically, FIG. 14A shows the restraint type of adjusting characteristic in which the adjusting amount is restrained when the driver's body size is smaller than the specified size. FIG. 14B shows the turnover type of adjusting characteristic in which the adjusting direction is turned over when the driver's body size is smaller than the specified size. FIG. 14C shows the prohibition type of adjusting characteristic in which the adjusting is prohibited when the driver's body size is smaller than the specified size.

The above-described adjusting characteristics enables a mechanical control using gears and the like, and thereby the system mechanism can be simplified.

Herein, the adjusting control with the function of the secondary degree shown in FIGS. 9A-9C, 11A-11C, 13A-13C and the adjusting control with the linear function shown in FIGS. 14A-14C may be combined. For example, the accelerator pedal 71 may be adjusted with the linear function, while the brake pedal 81 may be adjusted with the function of the secondary degree. Also, the adjusting with the opposite characteristics to the above may be adopted. Further, the movable floor 51 may be adjusted with the function of the secondary degree, while the pedals 71 and 81 may be adjusted with the linear function, or the adjusting with the opposite characteristics to this may be adopted.

[Combination of the Adjusting Characteristics of the Floor and the Pedals]

Next, the combination of the adjusting characteristics of the movable floor 51 and the respective pedals 71 and 81 will be described.

For example, the combination of the restraint type of floor adjusting characteristic shown in FIG. 9A and either one of the turnover, the restraint and the prohibition types of pedal adjusting characteristics shown in FIGS. 9B, 9C, 11B, 11C, 13B, and 13C may be adopted.

And, the combination of the overturn type of floor adjusting characteristic shown in FIG. 11A and either the restraint type or the prohibition type of pedal adjusting characteristics shown in FIGS. 11B, 11C, 13B, and 13C may be adopted.

Further, the combination of the prohibition type of floor adjusting characteristic shown in FIG. 13A and either one of the turnover, the restraint and the prohibition types of pedal adjusting characteristics shown in FIGS. 9B, 9C, 11B, 11C, 13B, and 13C may be adopted.

[Combination of the Adjusting Characteristics of the Accelerator and Brake Pedals]

Next, the combination of the adjusting characteristics of the accelerator pedal 71 and the brake pedal 81 will be described.

Figure 15:
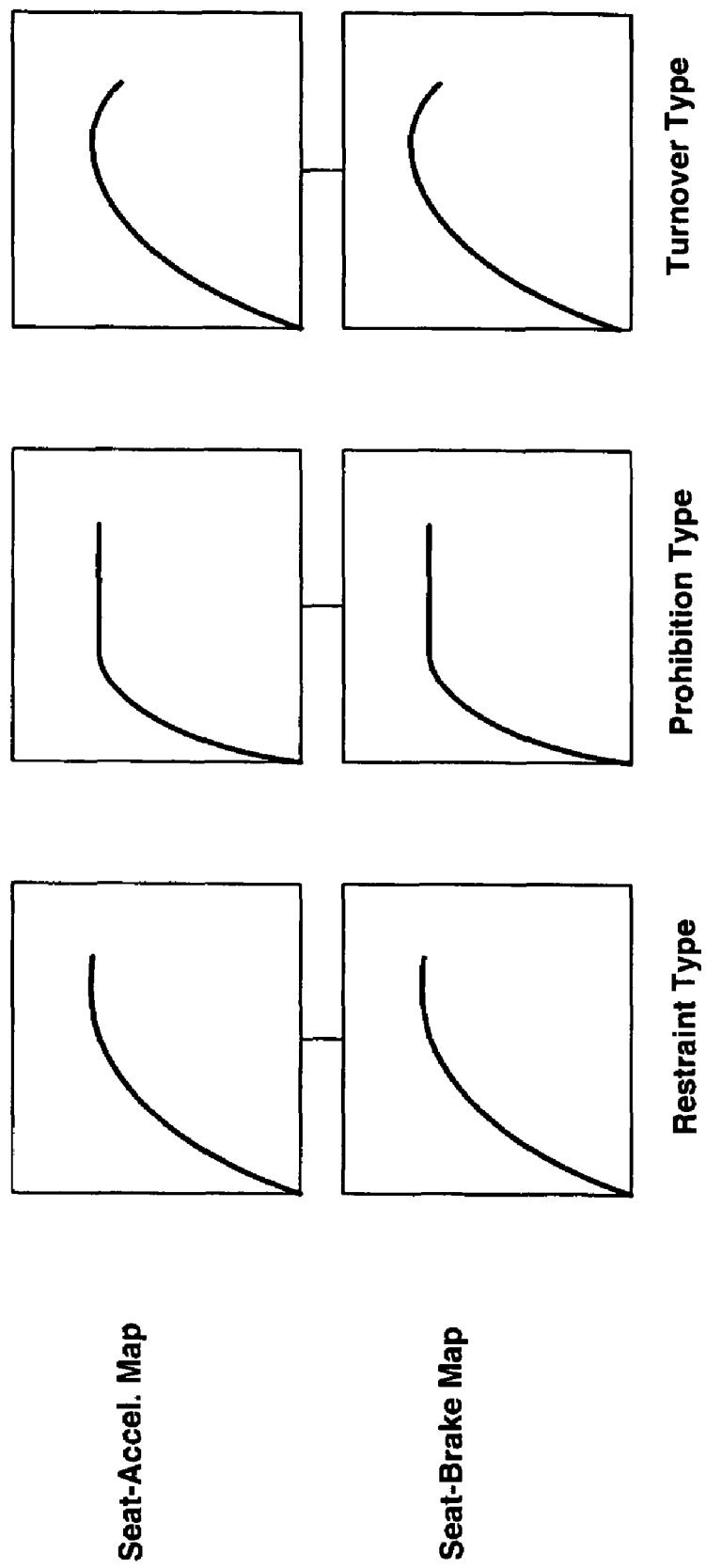
FIG. 15 is exemplified combined adjusting characteristics of the accelerator pedal and brake pedal.

First, as shown in FIG. 15, the adjusting characteristics of the accelerator pedal 71 and the brake pedals 81 are the same type of characteristics. Namely, the both adjusting characteristics of the both pedals is the restraint type, the prohibition type, or the turnover type.

In the event that the same type of adjusting characteristic is applied to the both pedals 71 and 81, the control can be facilitated. Herein, although the longitudinal distance between the pedals 71 and 81 does not change, the lateral distance between them changes because of the inclined movement direction of the accelerator pedal 71 illustrated FIG. 6.

Figure 16:
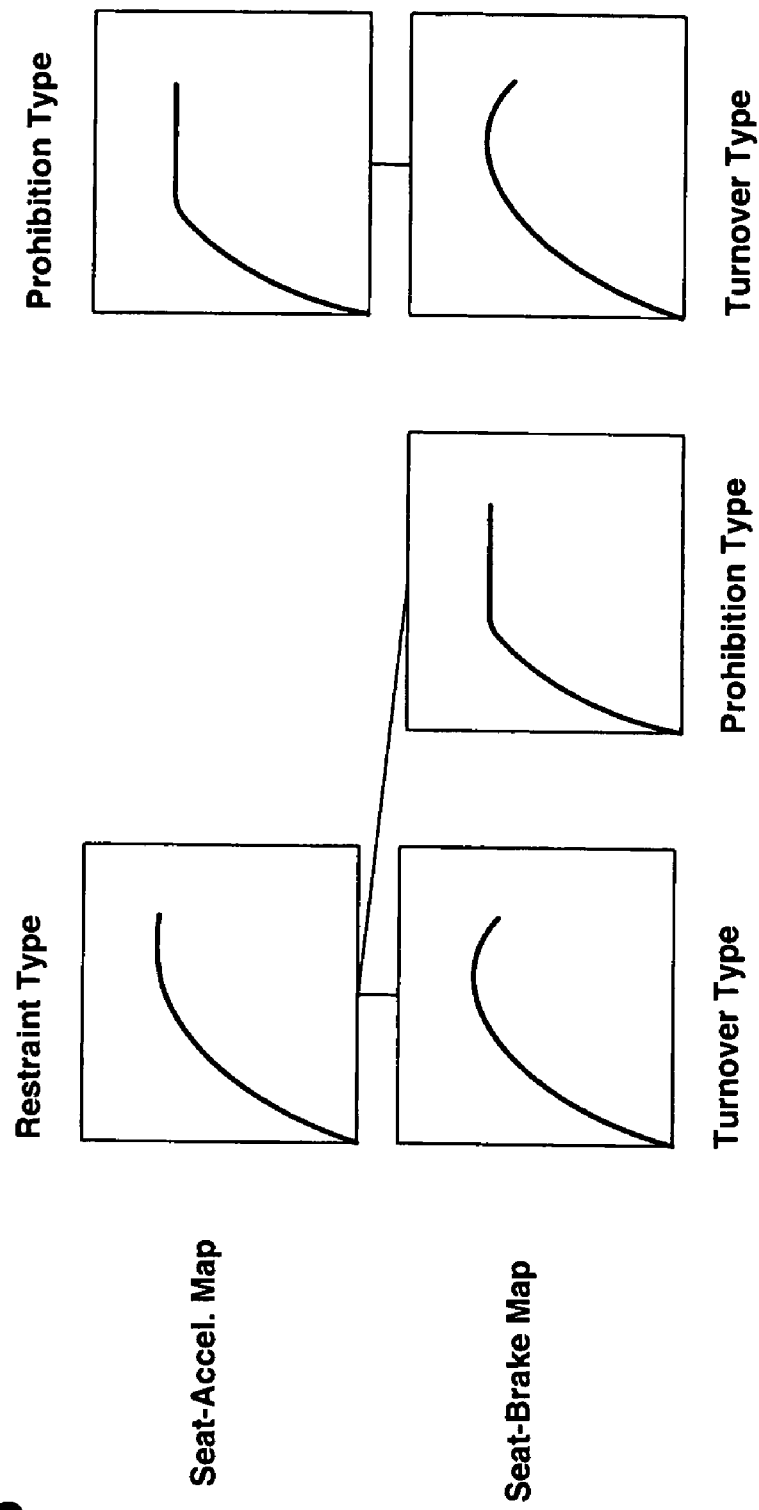
FIG. 16 is other exemplified combined adjusting characteristics of the accelerator pedal and brake pedal.

Meanwhile, as shown in FIG. 16, the both adjusting characteristic of the pedals 71 and 81 may be different from each other such that the longitudinal distance between the both pedals becomes smaller as the driver's body size becomes smaller. Namely, when the restraint type of adjusting characteristic is adopted for the accelerator pedal 71, the turnover type or the prohibition type of adjusting characteristics are adopted for the brake pedal 81. When the prohibition type of adjusting characteristic is adopted for the accelerator pedal 71, the turnover type of adjusting characteristic is adopted for the brake pedal 81.

According to this combination of adjusting characteristics of the pedals 71 and 81, the longitudinal distance between the pedals 71 and 81 becomes small. And, the lateral distance between them becomes small as well as described above. As a result, it can be easy for the small driver having the relatively small foot to change the pedal pressing between the pedals 71 and 81, thereby improving the pedal-pressing changing.

Figure 17:
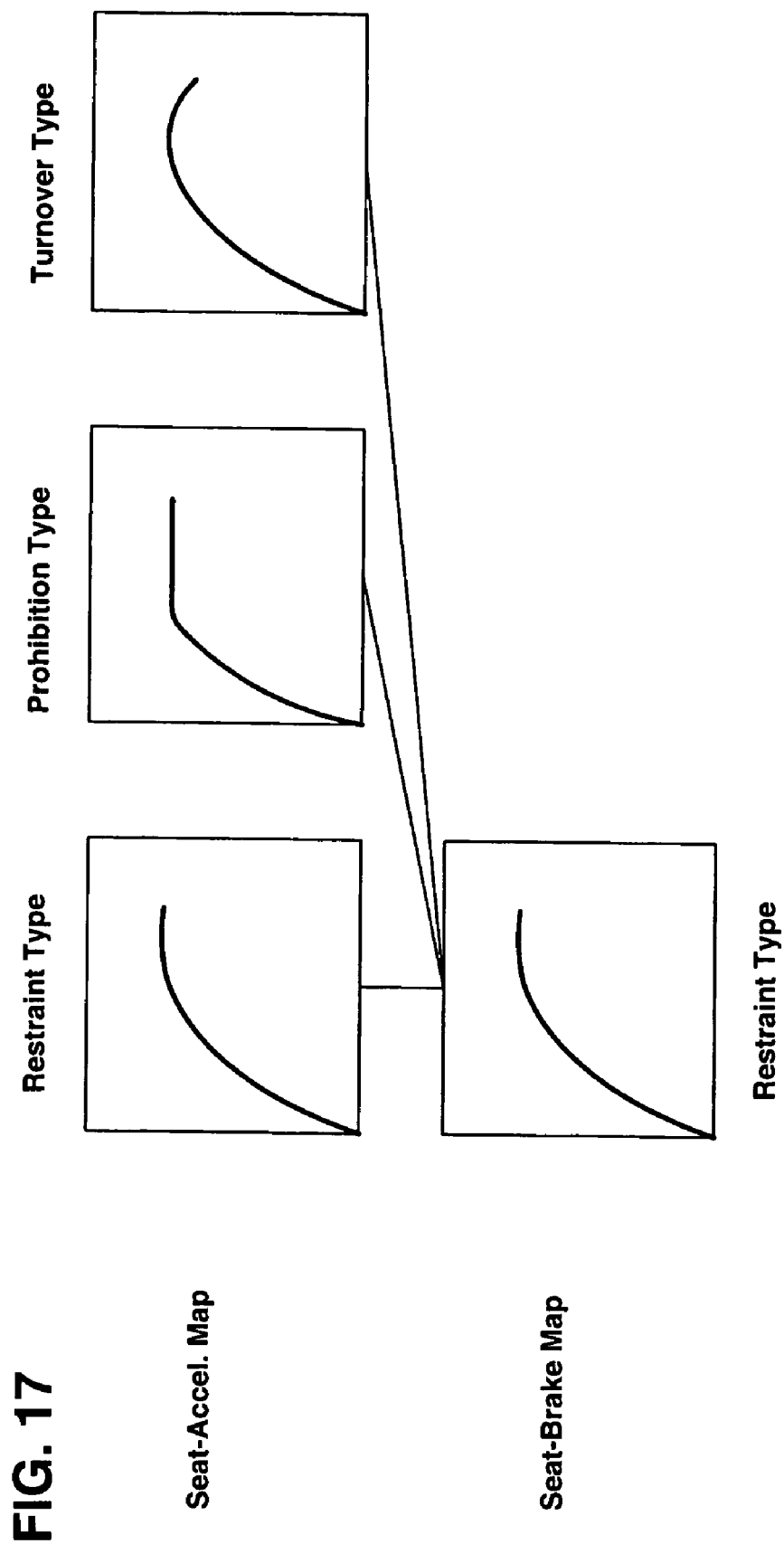
FIG. 17 is further other exemplified combined adjusting characteristics of the accelerator pedal and brake pedal.

Also, the adjusting characteristic of the accelerator pedal 71 may be set at the restraint type, the prohibition type, or the turnover type, and the adjusting characteristic of the brake pedal 81 may be set at the prohibition type, as shown in FIG. 17.

Namely, only the restraint type of adjusting characteristic may be applied to the brake pedal 81. Generally, the accelerator pedal 71 is pressed by a foot with its heel placed on the floor and therefore the appropriate arrangement position of the accelerator pedal 71 is affected by the heel height of the shoes which the driver wears. Accordingly, the appropriate adjusting of the accelerator pedal 71 considering the heel height of the driver's shoes can be attained with the restraint type, the prohibition type, or the turnover type of adjusting characteristics for the accelerator pedal 71.

Meanwhile, since the brake pedal 81 is pressed by the foot with its heel away from the floor in most cases, the appropriate arrangement position of the brake pedal 81 would not be affected by the heel height of the shoes. Also, the brake pedal 81 tends to receive relatively strong pressing forces during the quick braking or the like, and generally the smaller sized drivers tend to press the pedal with a relatively smaller pressing force. Accordingly, it is preferable that the adjusting characteristic of the brake pedal 81 is set at the restraint type in which the brake pedal 81 becomes closer to the driver as the driver's body size becomes smaller. Thereby, the appropriate pressing force can be ensured according to the driver's body size, properly adjusting the arrangement position of the brake pedal 81.

Herein, the adjusting of the brake pedal 81 may be done only with the first adjusting characteristic. In this case, likewise, the appropriate pressing force can be ensured according to the driver's body size, properly adjusting the arrangement position of the brake pedal 81.

[Other Embodiments]

Although the above-described embodiment shows that the seat adjusting device 4 is comprised of the double links with different length, other structures may be adopted. The seat 31 may be constituted such that its sitting face is adjusted so as to move only longitudinally.

Further, although the above-described embodiment shows that the adjusting of the pedals 71 and 81 and the adjusting of the movable floor 51 are done together, only the adjusting of the pedals 71 and 81 may be done according to the driver's body size. Namely, the floor near the pedal may not be the movable floor 51.

The present invention should not be limited to the above-described embodiments and modified characteristics, but any other modifications and improvements may be applied within the scope of a sprit of the present invention.

What is claimed is:

1. A driving position adjusting device for an automotive vehicle which adjusts a driving position of a driver in a driver's seat, comprising:
   a driver's body size detecting device operative to detect a body size of the driver;
   a driving operational system including a pedal operated by the driver;
   an adjusting device operative to adjust a position of said driving operational system;
   a control device operative to control said adjusting device, wherein said control device controls said adjusting device with a first adjusting characteristic and a second adjusting characteristic according to the driver's body size detected by said driver's body size detecting device, said first adjusting characteristic being such that the position of said driving operational system adjusted by said adjusting device becomes closer to the driver as the driver's body size detected becomes small, said second adjusting characteristic being to control said adjusting device for the driver having a relatively small body size whose body size detected is smaller than a specified body size, said second adjusting characteristic having a different characteristic with respect to the driver's body size from said first adjusting characteristic.

2. A driving position adjusting device for an automotive vehicle which adjusts a driving position of a driver in a driver's seat, comprising:
   a driver's body size detecting device operative to detect a body size of the driver;
   at least one pedal operated by the driver;
   a pedal adjusting device operative to adjust an arrangement position of said at least one pedal; and
   a control device operative to control said pedal adjusting device,
   wherein said control device controls said pedal adjusting device with a first adjusting characteristic and a second adjusting characteristic according to the driver's body size detected by said driver's body size detecting device, said first adjusting characteristic being such that the pedal arrangement position adjusted by said pedal adjusting device becomes closer to the driver as the driver's body size detected becomes small, said second adjusting characteristic being to control said pedal adjusting device for the driver having a relatively small body size whose body size detected is smaller than a specified body size, said second adjusting characteristic having a different characteristic with respect to the driver's body size from said first adjusting characteristic.

3. The driving position adjusting device for an automotive vehicle of claim 2, wherein said second adjusting characteristic is such that said pedal arrangement position adjusted by said pedal adjusting device becomes closer to the driver as the driver's body size detected becomes small, and such that a changing amount of adjusting said pedal arrangement position with respect to the driver's body size is restrained compared with said first adjusting characteristic.

4. The driving position adjusting device for an automotive vehicle of claim 2, wherein said second adjusting characteristic is such that said pedal arrangement position adjusted by said pedal adjusting device does not change substantially according to the driver's body size detected by said driver's body size detecting device.

5. The driving position adjusting device for an automotive vehicle of claim 2, wherein said second adjusting characteristic is such that said pedal arrangement position adjusted by said pedal adjusting device becomes further away from the driver as the driver's body size detected becomes small.

6. The driving position adjusting device for an automotive vehicle of claim 2, wherein there is provided a movable floor which is disposed near the pedal of said driving operational system and arranged so as to go up and down, said adjusting device further comprises a floor adjusting device operative to adjust a going-up-and-down position of said movable floor according to the driver's body size detected by said driver's body size detecting device.

7. The driving position adjusting device for an automotive vehicle of claim 2, wherein there are provided a seat adjusting device operative to adjust a position of a sitting face of the driver's seat and a seat position detecting device operative to detect the position of the sitting face of the driver's seat which is adjusted by said seat adjusting device, and said driver's body size detecting device comprises said seat position detecting device.

8. The driving position adjusting device for an automotive vehicle of claim 7, wherein said seat adjusting device adjusts a longitudinal position, a vertical position and an angle of the sitting face of the seat together such that the driver is located in a mode position corresponding to the driver's body size and the driver in the mode position is rotated around a specified rotational axis extending in a vehicle width direction, whereby driver's eyes can be located substantially at the same position regardless of the body size of the driver, and said pedal adjusting device adjusts the arrangement position of the pedal, in cooperation with the adjusting of the sitting face by said seat adjusting device.

9. A driving position adjusting device for an automotive vehicle which adjusts a driving position of a driver in a driver's seat, comprising:
   a driver's body size detecting device operative to detect a body size of the driver;
   a brake pedal operated by the driver;
   an accelerator pedal operated by the driver;
   a brake pedal adjusting device operative to adjust a position of said brake pedal;
   an accelerator pedal adjusting device operative to adjust a position of said accelerator pedal; and
   a control device operative to control said brake pedal adjusting device and accelerator pedal adjusting device,
   wherein said control device controls said brake pedal adjusting device with a first adjusting characteristic and controls said accelerator pedal adjusting device with another first adjusting characteristic and a second adjusting characteristic, said first and another first adjusting characteristics being such that respective pedal positions of the brake pedal and the accelerator pedal that are adjusted by said brake pedal adjusting device and accelerator pedal adjusting device become closer to the driver as the driver's body size detected becomes small, said second adjusting characteristic being to control said accelerator pedal adjusting device for the driver having a relatively small body size whose body size detected is smaller than a specified body size, said second adjusting characteristic having a different characteristic with respect to the driver's body size from said another first adjusting characteristic.

10. A driving position adjusting device for an automotive vehicle which adjusts a driving position of a driver in a driver's seat, comprising:
  a driver's body size detecting device operative to detect a body size of the driver;
  a brake pedal operated by the driver;
  an accelerator pedal operated by the driver;
  a brake pedal adjusting device operative to adjust a position of said brake pedal;
  an accelerator pedal adjusting device operative to adjust a position of said accelerator pedal; and
  a control device operative to control said brake pedal adjusting device and accelerator pedal adjusting device,
  wherein said control device controls said brake pedal adjusting device and said accelerator pedal adjusting device according to the driver's body size detected by said driver's body size detecting device such that a relative position of the brake pedal and the accelerator pedal becomes closer as the driver's body size detected becomes small.

11. A driving position adjusting device for an automotive vehicle which adjusts a driving position of a driver in a driver's seat, comprising:
  a driver's body size detecting device operative to detect a body size of the driver;
  a pedal operated by the driver;
  a movable floor provided near said pedal and arranged so as to go up and down;
  a floor adjusting device operative to adjust a going-up-and-down position of said movable floor; and
  a control device operative to control said pedal adjusting device, wherein said control device controls said floor adjusting device with a first adjusting characteristic and a second adjusting characteristic according to the driver's body size detected by said driver's body size detecting device, said first adjusting characteristic being such that the going-up-and-down position of said movable floor adjusted by said floor adjusting device becomes higher as the driver's body size detected becomes small, said second adjusting characteristic being to control said floor adjusting device for the driver having a relatively small body size whose body size detected is smaller than a specified body size, said second adjusting characteristic having a different characteristic with respect to the driver's body size from said first adjusting characteristic.

12. The driving position adjusting device for an automotive vehicle of claim 11, wherein said second adjusting characteristic is such that said going-up-and-down position of said movable floor adjusted by said floor adjusting device becomes closer to the driver as the driver's body size detected becomes small, and such that a changing amount of adjusting said going-up-and-down position of said movable floor with respect to the driver's body size is restrained compared with said first adjusting characteristic.

13. The driving position adjusting device for an automotive vehicle of claim 11, wherein said second adjusting characteristic is such that said going-up-and-down position of said movable floor adjusted by said floor adjusting device does not change substantially according to the driver's body size detected by said driver's body size detecting device.

14. The driving position adjusting device for an automotive vehicle of claim 11, wherein said second adjusting characteristic is such that said going-up-and-down position of said movable floor adjusted by said floor adjusting device becomes lower as the driver's body size detected becomes small.

15. The driving position adjusting device for an automotive vehicle of claim 11, wherein there is further provided a pedal adjusting device operative to adjust an arrangement position of the pedal of said driving operational system according to the driver's body size detected by said driver's body size detecting device.

16. The driving position adjusting device for an automotive vehicle of claim 11, wherein there are provided a seat adjusting device operative to adjust a position of a sitting face of the driver's seat and a seat position detecting device operative to detect the position of the sitting face of the driver's seat which is adjusted by said seat adjusting device, and said driver's body size detecting device comprises said seat position detecting device.

17. The driving position adjusting device for an automotive vehicle of claim 16, wherein said seat adjusting device adjusts a longitudinal position, a vertical position and an angle of the sitting face of the seat together such that the driver is located in a mode position corresponding to the driver's body size and the driver in the mode position is rotated around a specified rotational axis extending in a vehicle width direction, and said floor adjusting device is configured to adjust at least both the going-up-and-down position and an angle of the movable floor, whereby driver's eyes can be located substantially at the same position regardless of the body size of the driver, and said floor adjusting device adjusts the going-up-and-down position and the angle of the movable floor, in cooperation with the adjusting of the sitting face by said seat adjusting device.

18. A driving position adjusting device for an automotive vehicle which adjusts a driving position of a driver in a driver's seat, comprising:
  a driver's body size detecting device operative to detect a body size of the driver;
  a pedal operated by the driver;
  a movable floor which is disposed near said pedal and arranged so as to go up and down;
  a floor adjusting device operative to adjust a going-up-and-down position of said movable floor; and
  a control device operative to control said floor adjusting device,
  wherein said control device controls said floor adjusting device with a first adjusting characteristic and a second adjusting characteristic according to the driver's body size detected by said driver's body size detecting device, said first adjusting characteristic being such that the going-up-and-down position of said movable floor adjusted by said floor adjusting device becomes higher as the driver's body size detected becomes small, said second adjusting characteristic being to control said floor adjusting device for the driver having a relatively small body size whose body size detected is smaller than a specified body size, said second adjusting characteristic being such that the going-up-and-down position of said movable floor adjusted by said floor adjusting device does not change substantially according to the driver's body size detected by said driver's body size detecting device, wherein there are further provided a pedal adjusting device operative to adjust an arrangement position of said pedal according to the driver's body size detected by said driver's body size detecting device, a seat adjusting device operative to adjust a position of a sitting face of the driver's seat, and a seat position detecting device operative to detect the position of the sitting face of the driver's seat which is adjusted by said seat adjusting device, wherein said driver's body size detecting device comprises said seat position detecting device, and wherein said seat adjusting device adjusts a longitudinal position, a vertical position and an angle of the sitting face of the seat together such that the driver is located in a mode position corresponding to the driver's body size and the driver in the mode position is rotated around a specified rotational axis extending in a vehicle width direction, and said floor adjusting device is configured to adjust at least both the going-up-and-down position and an angle of the movable floor, whereby driver's eyes can be located substantially at the same position regardless of the body size of the driver, and said floor adjusting device adjusts the going-up-and-down position and the angle of the movable floor, in cooperation with the adjusting of the sitting face by said seat adjusting device.

* * * * *